United States Patent [19]

Fukasawa et al.

[11] Patent Number: 5,629,076
[45] Date of Patent: May 13, 1997

[54] EXTRUDED PROPYLENE POLYMER RESIN FOAM

[75] Inventors: Yoshihito Fukasawa, Seattle, Wash.; Satoshi Hashimoto, Kurashiki, Japan

[73] Assignee: Asahi Kasei Kogyo Kabushiki Kaisha, Osaka, Japan

[21] Appl. No.: 624,531

[22] PCT Filed: Jan. 31, 1995

[86] PCT No.: PCT/JP95/00126

§ 371 Date: Jun. 24, 1996

§ 102(e) Date: Jun. 24, 1996

[87] PCT Pub. No.: WO95/20622

PCT Pub. Date: Aug. 3, 1995

[30] Foreign Application Priority Data

Jan. 31, 1994 [JP] Japan ................... 6-009394

[51] Int. Cl.$^6$ ................... C08J 9/00; B32B 3/26
[52] U.S. Cl. ................... 428/220; 264/210.7; 264/235.8; 264/290.2; 428/304.4; 521/79; 521/81; 521/142; 521/143
[58] Field of Search ................... 428/220, 304.4; 521/142, 143, 79, 81; 264/210.7, 235.8, 290.2

[56] References Cited

FOREIGN PATENT DOCUMENTS

| | | |
|---|---|---|
| 0463406 | 1/1992 | European Pat. Off. . |
| 59-36116 | 2/1984 | Japan . |
| 4-226109 | 8/1992 | Japan . |
| 4-363227 | 12/1992 | Japan . |
| 5-506875 | 10/1993 | Japan . |
| 6-192460 | 7/1994 | Japan . |
| 9113933 | 9/1991 | WIPO . |

OTHER PUBLICATIONS

Chatraei et al., Journal of Rheology, 25(4), 433–443 (1981).
Linster et al., Polymer Bulletin, 16, 187–194 (1986).

*Primary Examiner*—Morton Foelak
*Attorney, Agent, or Firm*—Birch, Stewart, Kolasch & Birch, LLP

[57] ABSTRACT

Disclosed is an extruded propylene polymer resin foam comprising a propylene polymer resin exhibiting a biaxial extensional viscosity of at least $3.0 \times 10^6$ poise at a biaxial extensional strain of 0.2, and a biaxial strain hardening rate $\alpha$ of at least 0.25, the biaxial strain hardening rate $\alpha$ being defined by the following formula:

$$\alpha = 0.77 \times (\log \eta_2 - \log \eta_1)$$

wherein $\eta_1$ represents the biaxial extensional viscosity at a biaxial extensional strain of 0.01, and $\eta_2$ represents the biaxial extensional viscosity at a biaxial extensional strain of 0.2, said foam containing a vast plurality of cells, and having a thickness of at least 20 mm, a density of from 0.005 to 0.03 g/cm$^3$, an average cell diameter of from 0.4 to 2.0 mm, and a closed cell ratio of at least 80%. The resin foam of the present invention has not only light weight, but also exhibits high cushioning performance and excellent mechanical strengths, so that, after fabricated into various sizes by cutting, the resultant resin foam articles can be advantageously used in the fields of cushion packaging materials, floating materials, and heat insulating materials.

11 Claims, 4 Drawing Sheets

EXTRUDED PROPYLENE POLYMER RESIN FOAM

BACKGROUND OF THE INVENTION

1. Technical Field

The present invention relates to a novel extruded propylene polymer resin foam. More particularly, the present invention is concerned with a novel extruded propylene polymer resin foam comprising a vast plurality of cells and a matrix constituted by cell walls of the cells and comprised of a propylene polymer resin, wherein said propylene polymer resin has high viscoelasticity characteristics, and wherein the foam has a thickness as large as at least 20 mm, a density as small as 0.03 g/cm$^3$ or less, an average cell diameter of from 0.4 to 2.0 mm and a closed cell ratio as large as at least 80%. The resin foam of the present invention has not only light weight, but also exhibits high cushioning performance and excellent mechanical strengths, so that, after fabricated into various sizes by cutting, the resultant resin foam articles can be advantageously used in the fields of cushion packaging materials, floating materials, and heat insulating materials.

2. Background Art

Extruded polyethylene resin foams have heretofore been well known, however, have various problems in respect of the properties thereof. On the other hand, propylene polymer resins have high rigidity as compared to polyethylene resins and, therefore, have advantages in that when foams are produced from propylene polymer resins, the foams can exhibit high mechanical strengths with the use of the resin in a reduced amount, so that excellent foams having light weight and excellent mechanical properties can be produced. Accordingly, various attempts have recently been made to improve propylene resin foams.

For example, Unexamined Japanese Patent Application Laid-Open specification No. H4-363227/1992 and Japanese Patent Application prior-to-examination Publication (kohyo) No. H5-506875/1993 (corresponding to International Patent Application Publication No. WO 91/13933) disclose extruded propylene polymer resin foams having a density of 0.03 g/cm$^3$ or less. However, any of the conventional extruded propylene polymer resin forms having a density of 0.03 g/cm$^3$ or less does not have a thickness and a closed cell ratio which are sufficient to exert high cushioning performance, so that these forms are unsatisfactory for use as cushion packaging materials.

With a view toward solving the problems accompanying the conventional propylene polymer resin forms, the present inventors have conducted experiments using extruded resin foams having different thicknesses which were produced from olefin polymer resins, such as ethylene polymer resins and propylene polymer resins, in order to find relationships between the thickness of the resin foam and the cushioning performance exerted by the resin foam. Observations have been made using a graph of dynamic impact characteristic curves showing the results of the experiments.

Referring to FIG. 3 of the accompanying drawings, there is shown a graph of dynamic impact characteristic curves, showing the relationships between the static stress generated on the resin foam and the peak acceleration sustained by the weight in the one-time dropping test, with respect to resin foams having different thicknesses. The dynamic impact characteristic curve was obtained by the experiments which were conducted in accordance with the "Testing Methods of Dynamic Compression for Package Cushioning Materials" prescribed in Japanese Industrial Standards (JIS) Z 0235, using extruded polyethylene resin foams each having a density of 0.025 g/cm$^3$ and respectively having thicknesses of 20, 30 and 40 mm. From FIG. 3 and an explanation thereon (which is given below), not only will the meaning of the "cushioning performance" be made clear, but also it will be understood that for exerting an satisfactory cushioning performance it is necessary for a resin foam to have a thickness of at least 20 mm.

In the graph of FIG. 3 which shows the dynamic impact characteristic curves, the ordinate indicates the peak acceleration J (0–100 G), and the abscissa having a logarithmic scale indicates the static stress I (0.02–0.4 kgf/cm$^2$). This graph has been prepared as follows. A predetermined number of different weights, each having an accelerometer equipped inside thereof, are individually dropped on resin foams to measure maximum accelerations with respect to the respective weights. Such maximum accelerations are defined as "peak accelerations". On the other hand, the respective weights are statically placed on the resin foams, and static stresses generated by the weights are obtained. The obtained peak acceleration values are plotted against the static stress values to obtain dynamic impact characteristic curves.

The experiments for obtaining FIG. 3 were conducted using different weights respectively capable of generating different static stresses in the range of from 0.02 to 0.4 kgf/cm$^2$ on the foam. The range of from 0.02 to 0.4 kgf/cm$^2$ covers the magnitudes of static stress which are generated when household electric apparatus, personal computers, OA (office automated) equipment, precision machines, etc. having a weight of about 5 to 50 kg are statically placed on resin foams. In FIG. 3, characters "t20", "t30" and "t40" respectively mean curves obtained with respect to foams having thicknesses of 20 mm, 30 mm and 40 mm. The minimum value of the peak accelerations which can be obtained from the dynamic impact characteristic curve indicates the minimum peak acceleration (load) which is experienced by the foam (corresponding to the characteristic curve) when the foam is used as a cushion packaging material for articles, such as household electric apparatus etc. This minimum peak acceleration indicates the maximum cushioning performance which the foam can exhibit.

It has also been found that the peak acceleration which does not cause mechanical troubles or damage on the articles, such as household electric apparatus etc., is generally 80 G or less. FIG. 3 clearly shows that when a foam having a thickness of less than 20 mm is used for packaging an article generating a static stress in the above-mentioned range (0.02 to 0.4 kgf/cm$^2$), the peak acceleration which is experienced by the packaged article in the dropping thereof exceeds 80 G as an acceptable level, so that the article is likely to suffer mechanical troubles or damages. Accordingly, it will be understood that foams having a thickness of less than 20 mm are not suitable for use as safety packaging material for articles, such as household electric apparatus.

Further, as a result of the investigations by the present inventors, it has been found that for maintaining the cushioning performance even when repeatedly sustain impact, it is necessary for foams to have a closed cell ratio of at least 80%. When the closed cell ratio of the foam is less than 80%, the ratio of the minimum peak acceleration sustained by the foam at 2 to 5 times repeated dropping tests to that at a one-time dropping test disadvantageously becomes large and, therefore, such a foam cannot be used as a cushion packaging material without a danger of causing mechanical troubles and damages of a packaged article.

Furthermore, as a result of the investigations by the present inventors, it has also been found that with respect to at least 20 mm-thick foams to be used as cushion packaging materials, it is necessary for the foams to have an average cell diameter of from 0.4 to 2.0 mm. When the average cell diameter is less than 0.4 mm, the ratio of the compression stress generated in an extrusion direction in the production of a foam by extrusion to the compression stress generated in a thicknesswise direction becomes too large, so that the produced foam is caused to have a cushioning performance varied depending on the direction. Therefore, in actual use of the foam, it is necessary to carefully choose a direction in which the foam structure is used, which is cumbersome, so that the commercial value of such a direction-dependent foam as a cushion packaging material becomes very low. On the other hand, when the average cell diameter of the foam is more than 2.0 mm, such a foam has disadvantages in that not only is the surface appearance poor, but also the touch of the foam is unpleasant due to the large thickness of the cell wall, so that the commercial value of the foam becomes low also.

On the other hand, in the above-mentioned prior art publications, namely, Unexamined Japanese Patent Application Laid-Open Specification No. H4-363227 (hereinafter frequently referred to simply as "Japanese H4-363227A") and WO 91/13933 publication, it is described that it is difficult to produce an extruded foam from a propylene polymer resin as compared to the production of the extruded foam from a low density polyethylene resin. For example, in Japanese H4-363227A, it is described that since a propylene polymer resin has a high crystallinity as compared to a low density polyethylene resin, the viscoelasticity properties of the propylene polymer resin are likely to change according to a change (even slight) of temperature, so that the range of optimum temperature for extrusion becomes very narrow, leading to difficulties such that good quality foams cannot be obtained because it is not actually easy to adjust the temperature of the resin to a temperature within the above-mentioned narrow optimum range. For solving these problems of the above-mentioned two prior art publications, the following methods for producing propylene polymer resin foams have been proposed. In Japanese H4-363227A, it is described that when a propylene polymer resin exhibiting a melt tension of at least 7 gf at 230° C. is used, extruded plank foams having a density of from 0.18 to 0.018 g/cm³ and a thickness of from 10 to 100 mm can be obtained. In WO 91/13933, it is described that when a specific propylene polymer resin comprising a major moiety of a linear propylene polymer and a minor moiety of side chains highly branched from the linear propylene polymer is used, extruded sheet foams having a thickness of from 0.5 to 5.0 mm can be obtained.

By using the resin disclosed in WO 91/13933, a good quality foam can be obtained as long as the foam has a density of from 0.04 to 0.4 g/cm³ and a thickness of 5 mm or less. However, the technique of WO 91/13933 has a serious problem in that when it is intended to produce a plank foam having a thickness as large as 20 mm or more, the .breakage of the cell walls (membranes) markedly occurs, so that the closed cell ratio is drastically lowered. When a cell nucleating agent or the like is added to the foaming resin composition for the purpose of preventing the closed cell ratio from lowering, the size of the closed cells is caused to become very small and have a diameter of less than 0.4 mm, so that not only cannot a foam having an increased thickness be obtained, but also various serious problems occur such that anisotropy is observed in the compression stress and cushioning performance of the foam produced, that scalelike concave-convex portions occur in the surface of the produced foam, and that the produced plank foam is wholly deformed into a wavy shape (hereinafter frequently referred to as "corrugation phenomenon"). Thus, good quality foams cannot be obtained by the technique of WO 91/13933.

On the other hand, when the resin disclosed in Japanese H4-363227A is used, substantially the same unfavorable phenomena as in WO 91/13933 occur as major problems. This means that the described resin properties of a "melt tension of 7 gf at 230° C." cannot solve the essential problems accompanying the conventional resins as in WO 91/13933. More specifically stated, although Japanese H4-363227A contains a description that an extruded plank foam having a density of from 0.018 to 0.18 g/cm³ and a thickness of from 10 to 100 mm can be obtained, actual experiments show that a foam having a thickness increased to about 30 to 100 mm is obtained only when the density of the foam is on the order of from 0.10 to 0.18 g/cm³, and that, however, when it is intended to obtain a highly expanded foam having a density reduced to a level as low as 0.03 g/cm³ or less, the foam produced necessarily becomes a plank or sheet foam having a small thickness, i.e., a thickness of only 10 mm or less, so that the produced foam cannot exert a satisfactory cushioning performance in use as a cushion packaging material. In fact, in all of working examples in Japanese H4-363227A, which appear to contain a relatively sufficient disclosure for replication, there are only described foams having a thickness as small as 2 mm or less, which is believed to be ascribed to the difficult technical background as mentioned above.

As mentioned above, with the use of the specific resins used in Japanese H4-363227A and WO 91/13933, highly expanded foams having a high ratio of closed cells and satisfying requirements such that the density be from 0.005 to 0.03 g/cm³ and the thickness be at least 20 mm, cannot be obtained even if any production conditions are employed.

Therefore, if a cushion packaging material comprised of a propylene polymer resin foam having a thickness of 20 mm or more is desired, there has conventionally been no other measure than laminating a plurality of thin sheet foams having a thickness of from about 2 to 3 mm to each other by heating or by means of an adhesive to obtain a laminate foam structure. However, such a laminate foam is disadvantageous in that since a connection layer connecting the adjacent thin foams in the laminate foam structure is hard, a danger of impairing or damaging an article to be packaged is unavoidable when the article is contacted with the hard connection layer of the laminate foam structure, that since a large anisotropy occurs in compression stress and cushioning performance between an exposed face portion of the hard connection layer and other face portions of the laminate foam, the commercial value of the laminate foam as a cushion packaging material becomes very low, and that the production of such a laminate foam structure involves, in addition to the conventional extrusion-foaming step, an additional lamination step, which leads to a considerable increase in production cost.

In the above-mentioned situations, the present inventors have made extensive and intensive studies with a view toward developing propylene polymer resin foams exhibiting not only high cushioning performance and mechanical strength properties, but also light weight and excellent appearance. As a result, it has unexpectedly, surprisingly been found that when a specific propylene polymer resin exhibiting a biaxial extensional viscosity of at least $4.5 \times 10^6$ poise at a biaxial extensional strain of 0.2, and a biaxial strain hardening rate of at least 0.30 (wherein the biaxial strain hardening rate is defined herein) is used as a resin to be supplied to an extruder (such a resin is hereinafter frequently referred to as "base resin"), and the base resin is subjected to extrusion foaming molding, an extruded propylene polymer resin foam having large thickness can be obtained. This extruded propylene polymer resin foam comprises a plurality of closed cells defined by cell walls which constitute a matrix of the foam, wherein the matrix comprising a propylene polymer resin exhibiting a biaxial extensional viscosity of at least $3.0 \times 10^6$ poise at a biaxial extensional strain of 0.2, and a biaxial strain hardening rate of at least 0.25 (wherein the biaxial strain hardening rate is defined herein), and wherein the foam has specific foam properties which have not heretofore been realized, that is, the foam is a single layer foam having a thickness of at least 20 mm, a density of from 0.005 to 0.03 g/cm$^3$, an average cell diameter of from 0.4 to 2.0 mm, and a closed cell ratio of at least 80%.

This extruded propylene polymer resin foam exhibits 80 G or less in terms of the minimum peak acceleration when tested in accordance with the "Testing Methods of Dynamic Compression for Package Cushioning Materials" prescribed in Japanese Industrial Standards (JIS) Z 0235, in which weights are dropped from a height of 60 cm on the foam. Thus, the extruded propylene polymer resin foam exhibits not only high cushioning performance and mechanical strength properties, but also has light weight and excellent appearance.

The present invention has been completed, based on the above novel findings.

Accordingly, a primary object of the present invention is to provide an extruded propylene polymer resin foam which exhibits not only high cushioning performance and mechanical strength properties, but also can maintain high cushioning performance even when repeatedly sustain impact, and which has light weight and excellent appearance.

The foregoing and other objects, features and advantages of the present invention will be apparent from the following detailed description and appended claims taken in connection with the accompanying drawings.

BRIEF DESCRIPTION OF THE DRAWINGS

In the accompanying drawings:

In FIGS. 1 through 4, the reference numerals and characters have the following meanings:

Figure 1:
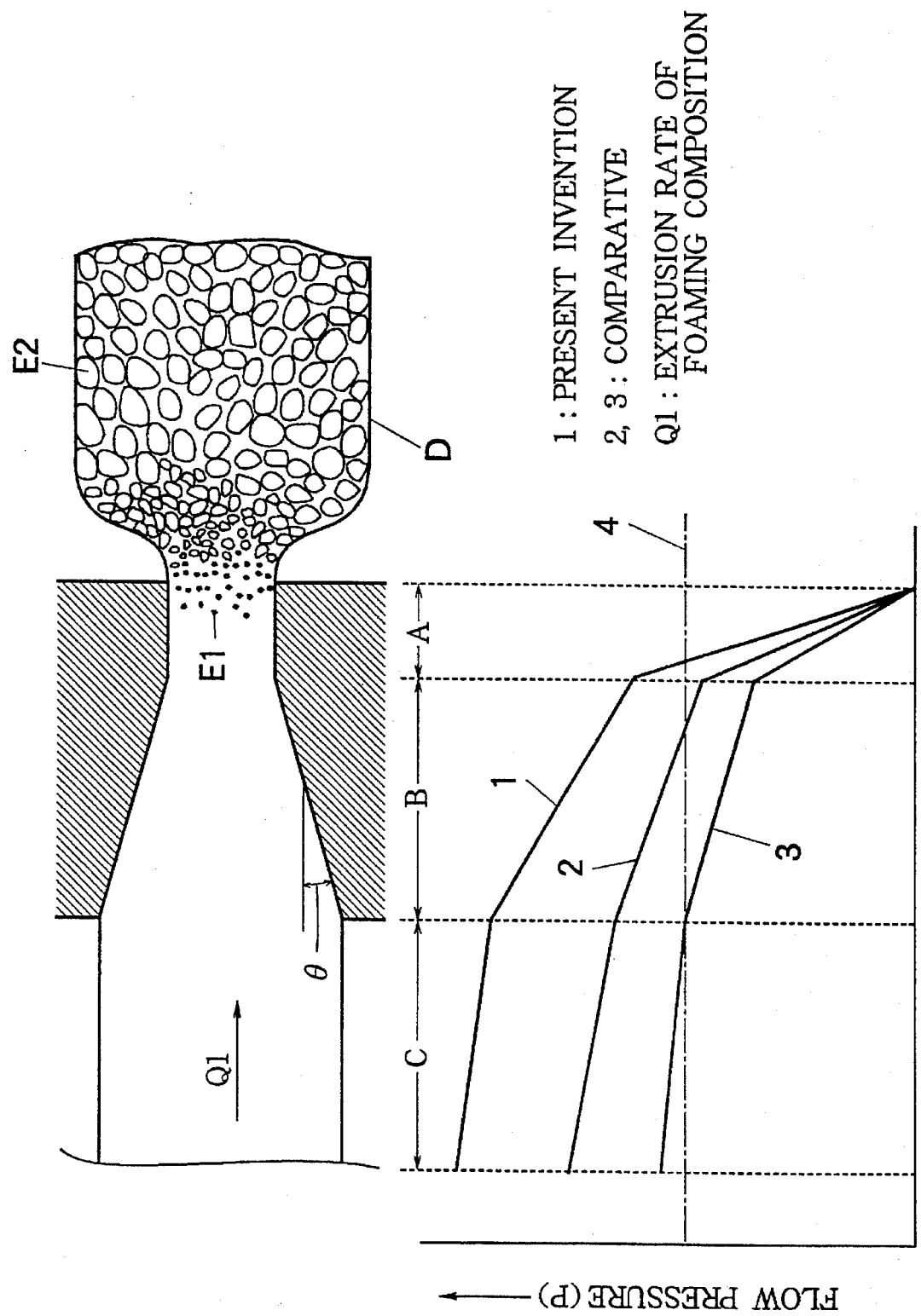
FIG. 1 is an explanatory diagram showing the growth of cells and formation of a foam in the vicinity of an extrusion die attached to an extruder (i.e., in the inside and outside of the extrusion region)

A: Land region of the extrusion die
B: Taper region of the extrusion die
C: Forward end region of the extruder
D: Foam of the present invention, obtained using a specific resin
F' and F": Comparative foams obtained using conventional resins
E1, E2, G1 and G2: Cells in the respective foams
Q1 and Q2: Extrusion rate of the foaming composition
P: Flow pressure
θ: Angle of the taper portion of the extrusion die
J: Peak acceleration
I: Static stress
t20: Dynamic impact characteristic curve of the polyethylene foam having a thickness of 20 mm
t30: Dynamic impact characteristic curve of the polyethylene foam having a thickness of 30 mm
t40: Dynamic impact characteristic curve of the polyethylene foam having a thickness of 40 mm
K: Cushioning performance lowering index
R: After-compression thickness recovery
Et: Ethylene content
1: Curve showing the change in flow pressure of the foaming composition in the extruder and in the extrusion die, wherein the foaming composition comprises the specific resin to be used in the present invention
2, 3, 3' and 3": Curves respectively showing the changes in flow pressure of the foaming compositions in the extruder and in the extrusion die, wherein the foaming compositions respectively comprise conventional comparative resins
4: Vapor pressure of the foaming agent in the extrusion region
5: Line showing the cushioning performance lowering index K of 1.3
6: Line showing the after-compression thickness recovery R of 95%

DETAILED DESCRIPTION OF THE INVENTION

According to the present invention, there is provided an extruded propylene polymer resin foam comprising a plurality of closed cells defined by cell walls which constitute a matrix of the foam, the matrix comprising a propylene polymer resin exhibiting at a biaxial extensional strain of 0.2, a biaxial extensional viscosity of at least $3.0 \times 10^6$ poise and a biaxial strain hardening rate α of at least 0.25, the biaxial strain hardening rate α being defined by the following formula:

$$\alpha = 0.77 \times (\log \eta_2 - \log \eta_1)$$

wherein $\eta_1$ represents the biaxial extensional viscosity at a biaxial extensional strain of 0.01, and $\eta_2$ represents the biaxial extensional viscosity at a biaxial extensional strain of 0.2, wherein the foam has a thickness of at least 20 mm, a density of from 0.005 to 0.03 g/cm³, an average cell diameter of from 0.4 to 2.0 mm, and a closed cell ratio of at least 80%, in which the closed cell ratio is defined as the percentage of the volume of closed cells, based on the total volume of the closed cells and open cells in the foam.

The present invention is explained below in detail.

In order to make it easy to understand the present invention, the meanings of and measuring method for various parameters and properties used herein for characterization of the extruded propylene polymer resin foam of the present invention are summarized below. In this connection, it should be noted that when measurement is done with respect to the foam, a test sample foam is prepared by a method in which a produced foam is continuously subjected to aging at 40° C. until the aged foam is stabilized to show no volume change ratio of more than 1% as measured with respect to an arbitrarily selected time period of 30 days. The stabilized foam is used as a test sample foam.

(1) Biaxial extensional viscosity and Biaxial strain hardening rate:

With respect to the details of the "biaxial extensional viscosity", reference may be made to S. H. Chatraei et al., "Journal of Rheology" edited by The Society of Rheology, Inc., and published by John Willey & Sons, Inc., U.S.A., 25(4), 433–443 (1981).

Measurement is done in accordance with the lubricated squeezing flow method, using, for example, liquid biaxial viscosity measuring apparatus BE-100, produced and sold by Iwamoto Mfg. Co., Ltd., Japan. In the measurement, a foam, and a base resin used for the foam are used as samples, in which the samples are molded with defoaming into a disk having a diameter of 16±1 mm and a thickness of 6.5±0.5 mm. As a lubricant, a silicone oil (KF 968- 100 CS produced and sold by Shinetsu Chemical Industry Co., Ltd., Japan) is used. The lubricant is coated on the respective facing surfaces of two plates (maintained at 200°±1° C.) arranged so as to face each other. The sample, the overall surface of which is coated with the silicone oil, is placed between the two plates. After the plate temperature has been stably maintained at 200°±1° C., the biaxial extension properties are measured at a biaxial strain velocity of 0.01 sec⁻¹. The measurement is done within 30 minutes after placing the sample between the two plates. Biaxial extensional viscosity $\eta_2$ at a biaxial extensional strain of 0.2 is measured. Further, biaxial extensional viscosity $\eta_1$ at a biaxial extensional strain of 0.01 is measured. Biaxial strain hardening rate $\alpha$ is defined as a rate of the change of biaxial extensional viscosity versus the difference in time between the two time periods for which the biaxial extension strains become 0.01 and 0.2, each at a biaxial extension strain velocity of 0.01 sec⁻¹ respectively, and can be calculated by the following formula:

$$\alpha=0.77\times(\log \eta_2-\log \eta_1)$$

With respect to the "biaxial strain hardening rate", reference may be made to, for example, J. J. Linster et al., "Polymer Bulletin", 16, 187–194 (1986), Springer-Verlag.

(2) Swell index S:

The swell index S is obtained by extruding the propylene polymer resin in a molten form in a vertical direction at a shear rate of 650 sec⁻¹ through a capillary having an inner diameter of 2.095 mm and a length of 8.0 mm to thereby obtain a ribbon resin extrudate, wherein S is defined as a ratio of the diameter of the extrudate to the inner diameter of the capillary. Measurement of the swell index is done using Capillograph IC (produced and sold by Tokyo Seiki K.K., Japan). More illustratively stated, use is made of a capillary having an inner diameter of 2.095 mm and a length of 8.0 mm. A base resin (which has previously been molded with defoaming as mentioned above) is charged in a barrel (maintained at 230° C.) by 10 to 20 g at a time and the charged resin is pushed 2 to 3 times by means of a pushing rod for deaeration at every charging of the resin. The above operation is repeated until the charged volume of the resin becomes at least 50% of the inner volume of the barrel. Thereafter, a piston is moved down, so that the resin is extruded at a shear rate of 650 sec⁻¹ though the capillary to obtain a ribbon resin extrudate. The diameter W (mm) of the ribbon resin extrudate at a position of 10 mm below the bottom surface of the capillary (where the resin is in a recovered, swollen state) is measured, and swell index S is calculated by the following formula:

$$S=W/2.095.$$

The above measurement is done within 30 minutes after start of the charging of the resin.

(3) Mz and Mz/Mw:

The Z average molecular weight Mz and weight average molecular weight Mw are individually measured by high temperature gel permeation chromatography (GPC). In the measurement, GPC measuring apparatus Model 150C (produced and sold by Waters Assc. Co., U.S.A.) is used, in which 1,2,4-trichlorobenzene is used as a carrier solvent, and Shodex AT-80 M/S (produced and sold by Showa Denko K.K., Japan) is used as a column. The measurement is done under the following conditions: solution temperature of 140° C., solution concentration of 0.2% (w/v), and solvent flow rate of 1 ml/min.

(4) Melt tension

Measurement is done substantially in accordance with the method disclosed in Japanese H4-363227A, using a Capillograph IC (produced and sold by Toyo Seiki K.K., Japan). In the measurement, use is made of a capillary having an inner diameter of 2.095 mm and a length of 8.0 mm, and the same resin as used in the measurement of swell index S is charged in a barrel (maintained at 230° C.) in the same manner as in the measurement of swell index S. After confirming that the resin is completely melted, a piston is moved down at a rate of 10 mm/min to extrude the resin. The resultant ribbon resin extrudate is transferred through a tension detection pulley to a roll, and the ribbon resin extrudate is wound round the roll. While increasing the winding rate, the tension of the ribbon resin extrudate is continuously measured. When the ribbon resin extrudate does not break at a winding rate of 78.5 m/min or less, the tension sustained by the ribbon extrudate at the winding rate 78.5 m/min is taken as the melt tension of the resin. When the ribbon resin extrudate breaks at a winding rate of less than 78.5 m/min, the tension sustained by the ribbon resin extrudate at the winding rate applied to the extrudate just before the breakage of the extrudate is taken as the melt tension of the resin.

(5) MFR:

The MFR (melt flow rate) is measured substantially in accordance with JIS K7210, at a temperature of 230° C. under a load of 2.16 kgf.

(6) Thickness of foam:

The thickness of the foam is measured by means of slide calipers, using a cross-section of the foam (which cross-section is obtained by cutting the foam along a line perpendicular to the direction of extrusion of the foam) at a central portion of the width side of the cross-section.

(7) Closed cell ratio γ:

The closed cell ratio is defined as the percentage of the volume of closed cells, based on the total volume of the closed cells and open cells in the foam.

[Preparation of sample]

A regular rectangular parallelepiped having a side length of 20 mm is taken by cutting from a central portion of the foam, wherein the central portion is a central portion as determined in a cross-section of the foam, and used as a sample. When the thickness of the foam is less than 20 mm, a regular rectangular parallelepiped having a side length equal to the thickness of the foam is used as a sample.

When the cross-section of the foam has a void of a size such that a sphere having a diameter of 3 mm or more can be accommodated in the void, the foam is judged as having a void phenomenon (disqualified), and measurement of the closed cell ratio is not done.

[Measuring method]

The closed cell ratio is measured substantially in accordance with the method described in ASTM-D2856. Using true volume Vx of the foam which is measured by means of aero-comparison type aerometer, Model 930 which is produced and sold by Toshiba-Beckman K.K., Japan, the closed cell ratio is calculated by the following formula:

$$\gamma=(Vx-W/\rho)\times100/(Va-W/\rho) \ (\%)$$

wherein,

Vx: true volume of the foam=sum of the volume of the resin of the foam and the total inner volume of the closed cells in the foam ($cm^3$)

Va: apparent volume of the foam, which is calculated from the outer dimension of the foam ($cm^3$)

W: weight of the foam (g)

ρ: density of the resin of the foam ($g/cm^3$)

The measurement is conducted 5 times with respect to different sample foams, and average value of the obtained data is calculated.

(8) Occurrence of corrugation (evaluated in terms of average cell diameter):

Occurrence of corrugation is varied heavily depending on the extrusion method and the like used for producing a plank foam and, hence, a quantitative evaluation thereof is difficult to conduct. For this reason, in the present invention, occurrence of corrugation is evaluated in terms of the average cell diameter (average diameter of all cells including closed cells and open cells) which is closely related to the occurrence of corrugation. The criterion for evaluation is described below.

[Preparation of sample]

The foam is cut along a plane perpendicular to the extrusion direction of the foam to obtain a sample having a thickness of 5 mm, in which a cross-section defined by the thickness and width of the foam is exposed.

[Average cell diameter-measuring method] (Gridline method)

An enlarged photograph (×10) of the cross-section of the sample is taken. A straight line is drawn on the photograph in a direction of the thickness t (mm) of the foam. The number (L) of the cells in contact with the straight line is counted, and the average cell diameter is calculated by the following formula:

Average cell diameter (mm)=1,626×(t/L)

When the cross-section of the foam has a void of a size such that a sphere having a diameter of 3 mm or more can be accommodated in the void, the foam is judged as having a void phenomenon (disqualified), and measurement of the average cell diameter is not done.

(9) Minimum peak acceleration $J_1$ at the one-time weight dropping test as the first dropping test, and Minimum value $J_{AV}$ of the average peak accelerations in the 2nd to 5th dropping tests:

$J_1$ is defined as a minimum value of peak accelerations respectively sustained by a predetermined number of different weights in the one-time weight dropping tests in which the predetermined number of different weights respectively capable of generating different static stresses in the range of from 0.02 to 0.4 $kgf/cm^2$ on the foam are used and the respective weights are individually dropped once from a height of 60 cm on the foam to obtain peak accelerations with respect to static stresses, wherein minimum value $J_1$ is read from a smooth curve obtained by plotting the peak acceleration against the static stress.

$J_{AV}$ is obtained by repeating 4 times the same weight dropping tests as the one-time weight dropping test as defined above as the first dropping test, obtaining four peak acceleration values in the 2nd to 5th dropping tests with respect to respective static stresses, calculating average peak acceleration values with respect to respective static stresses, and reading minimum value $J_{AV}$ of the average peak accelerations from a smooth curve obtained by plotting the average peak acceleration value against the static stress.

[Preparation of sample]

A foam (having a thickness defined by the distance between opposite surfaces parallel to the extrusion direction of the foam) is cut in a thicknesswise direction thereof to obtain a section, so that both opposite surfaces of the section (which surfaces correspond to the above-mentioned opposite surfaces of the foam) have an area which generates a static stress mentioned below when a weight is dropped on one of both opposite surfaces of the section.

[Measuring method]

Measurement is done in accordance with the "Testing Methods of Dynamic Compression for Package Cushioning Materials" prescribed in Japanese Industrial Standards (JIS) Z 0235. Measurements are conducted at static stresses in the range of from 0.02 to 0.4 $kgf/cm^2$. A predetermined number of different weights (each having an accelerometer equipped inside thereof) and a predetermined number of sample foams having different surfaces are provided, so that with respect to the static stress range of from 0.02 to 0.1 $kgf/cm^2$, different static stresses (which are different by 0.01 $kgf/cm^2$) can be generated, and so that with respect to the static stress range of from more than 0.1 to 0.4 $kgf/cm^2$, different static stresses (which are different by 0.1 $kgf/cm^2$) can be generated. The respective weights are individually dropped under gravity 5 times on a foam from a height of 60 cm at intervals of 30 seconds, to thereby measure peak accelerations sustained by the respective weights by means of the accelerometers. The peak accelerations obtained in the first weight dropping test with respect to the respective static stress, and the average peak accelerations obtained in the 2nd to 5th weight dropping tests with respect to the respective static stresses are, separately, plotted against the static stresses to obtain two smooth curves respectively for the first weight dropping test and the 2nd to 5th weight dropping tests. From the two respective curves, the minimum peak acceleration $J_1$ in the first weight dropping test and the minimum peak acceleration $J_{AV}$ in the 2nd to 5th weight dropping tests are obtained.

10. Cushioning performance lowering index K:

The cushioning performance lowering index K is obtained from the values of $J_1$ and $J_{AV}$ (obtained in item 9 above) by the following formula:

$K = J_{AV}/J_1$.

11. After-compression thickness recovery R:

The after-compression thickness recovery R is obtained by applying a pressure to the foam in a thicknesswise direction thereof at a rate of 500 mm/min to thereby compress the foam by 90% of the original foam thickness, relieving the foam from the pressure and allowing the relieved foam to stand for 24 hrs and recover the thickness thereof, and measuring the recovered foam thickness, wherein R is defined as the percentage of the recovered foam thickness, based on the original foam thickness.

[Preparation of sample]

A sample is prepared in substantially the same manner as in the preparation of a sample for measuring the closed cell ratio.

[Measuring method]

The thickness ($T_1$) of the sample foam is measured.

A pressure is applied to the sample foam in a thicknesswise direction thereof at a rate of 500 mm/min to thereby uniformly compress the foam by 90% of the original foam thickness ($T_1$), relieving the sample foam from the pressure and allowing the relieved foam to stand at 20°±2° C. and at a relative humidity of 65% for 24 hrs and recover the thickness thereof, and measuring the recovered foam thickness ($T_2$). The after-compression thickness recovery R is calculated by the following formula:

$$R(\%) = (T_2/T_1) \times 100.$$

The measurement is conducted with respect to three different samples, and an average value of the obtained data is calculated.

12. Compression stress anisotropy Z:

[Preparation of Sample]

A sample is prepared in the same manner as used in the preparation of the sample for measuring the closed cell ratio.

[Measuring method]

Measurement is done in substantially accordance with the "Testing Methods of Static Compression for Package Cushioning Materials" prescribed in Japanese Industrial Standards (JIS) Z 0234. A pressure is applied to the sample foam at a loading rate of 10 mm/min to thereby compress the foam by 25% of the original foam thickness. At this point, load V (kgf) and area U ($cm^2$) of the compressed surface of the foam are measured. Stress Y is obtained from the values of V and U by the following formula:

$$Y = V/U.$$

In each of the extrusion direction and the thicknesswise direction with respect to the sample foam, the sample foam is compressed separately, each of the stresses generated in a plane perpendicular to each of the directions are measured with respect to five samples, and average value of the obtained data is calculated. Thus, compression stress $Y_E$ (average value) generated in the extrusion direction and compression stress $Y_T$ (average value) generated in the thicknesswise direction are obtained, and compression stress anisotropy Z is calculated by the following formula:

$$Z = Y_E/Y_T.$$

13. Density of the foam:

[Preparation of sample]

A sample is prepared in the same manner as used in the preparation of the sample for measuring the closed cell ratio.

[Measuring method]

Measurement is done in accordance with the method prescribed in JIS K6767.

As described above, one of the most important features of the extruded propylene polymer resin foam of the present invention resides in the viscoelasticity characteristics of the resin constituting the matrix of the foam of the present invention (which resin is hereinafter frequently referred to as "matrix resin").

More specifically stated, the matrix resin of the foam (i.e., a resin which is obtained from the foam itself) has a feature such that it exhibits specific viscoelasticity characteristics, which are represented by a biaxial extensional viscosity of at least $3.0 \times 10^6$ poise at a biaxial extensional strain of 0.2, and a biaxial strain hardening rate α of at least 0.25, wherein the biaxial strain hardening rate is defined herein. With respect to the base resin to be supplied to an extruder for producing the foam of the present invention, the viscoelasticity characteristics thereof corresponding to the above-mentioned viscoelasticity characteristics of the matrix resin are represented by a biaxial extensional viscosity of at least $4.5 \times 10^6$ poise at a biaxial extensional strain of 0.2, and a biaxial strain hardening rate α of at least 0.30, wherein the biaxial strain hardening rate is defined herein. In other words, the present inventors have found that, by combining the use of the above-mentioned specific propylene polymer resin (base resin) with the below-mentioned modified extrusion foaming method devised for achieving an increase in the flow pressure of the foaming resin composition in the extruder and suppressing the occurrence of foaming in the extrusion die, the extrusion foaming mechanism of the resin can be successfully improved. As a result, it has been realized to provide a propylene polymer resin foam of the present invention which exhibits the following excellent properties, a density of from 0.005 to 0.03 g/cm³, an average cell diameter of from 0.4 to 2.0 mm and a closed cell ratio of at least 80%, even at a foam thickness as large as at least 20 mm.

Hereinbelow, explanation is made with respect to the difference in extrusion foaming mechanisms between the propylene polymer resin having the above-mentioned specific viscoelasticity characteristics, which resin is a base resin to be used for producing the foam of the present invention, and the propylene polymer resins which have been used as base resins in conventional techniques for producing resin foams. From the explanation, it will be understood that not only is the production of extruded propylene polymer resin foams very difficult, but also such excellent extruded propylene polymer resin foams as provided by the present invention cannot be produced by the above-mentioned conventional techniques.

The most important feature of the method for producing the extruded propylene polymer resin foam of the present invention resides in suppressing the occurrence of foaming in an extrusion die (such foaming is hereinafter frequently referred to as "intradie foaming"). FIG. 1 is an explanatory diagram showing the growth of cells and formation of a foam in the vicinity of an extrusion die of an extruder (i.e. in the inside and the outside of the extrusion region). In the graph of FIG. 1, the ordinate indicates the flow pressure (P) of a foaming composition (mixture of a molten resin, a foaming agent and additives, and hereinafter frequently referred to simply as "foaming composition") in the extrusion region. In FIG. 1, characters A, B and C respectively designate a land region of the extrusion die, a taper region of the extrusion die and a forward end region of the extruder; and bent lines shown therebelow respectively show the changes in flow pressure of foaming compositions in regions (A), (B) and (C) at an extrusion rate of Q1, wherein the foaming compositions are capable of providing highly expanded foam having a density not larger than 0.03 g/cm³. In the graph of FIG. 1, line 4 (dot-and-dash line) traversing the bent lines indicates the vapor pressure of the foaming agent contained in the foaming composition at the temperature of the extrusion region. Character D in FIG. 1 designates a foam which is being produced from the foaming composition comprising base resin 3 which is a specific resin to be used for producing the foam of the present invention, and diagrammatically illustrates the process of growth of cells. Characters E1 and E2 designate the cells generated in the foaming composition and the cells grown toward the formation of a foam, respectively. In FIG. 1, bent line 1 shows the change in flow pressure of the foaming composition which is used for producing the foam of the present invention [which base resin is identified as resin 3 (see Examples given below) (MFR: 1.9; a biaxial extensional viscosity of $6.7 \times 10^6$ poise at a biaxial extensional strain of 0.2, and a biaxial strain hardening rate $\alpha$ of 0.48, wherein the biaxial strain hardening rate is defined herein)]. Bent lines 2 and 3 respectively show the changes in flow pressure of the foaming compositions comprising comparative resins (commercially available resin products) which have been used for producing conventional foams. The comparative base resin having the flow pressure properties represented by bent line 2 is identified as resin 12 (see Comparative Examples given below) [a commercially available resin (MFR: 0.5; a biaxial extensional viscosity of $4.2 \times 10^6$ poise at a biaxial extensional strain of 0.2, and a biaxial strain hardening rate $\alpha$ of 0.22, wherein the biaxial strain hardening rate is defined herein)]. The comparative base resin having the flow pressure properties represented by bent line 3 is identified as resin 14 [a commercially available resin (MFR: 3.0; a biaxial extensional viscosity of $2.5 \times 10^6$ poise at a biaxial extensional strain of 0.2, and a biaxial strain hardening rate $\alpha$ of 0.44, wherein the biaxial strain hardening rate is defined herein)].

From FIG. 1, it is apparent that the specific base resin to be used for producing the foam of the present invention exhibits high flow pressure properties (represented by bent line 1) in the entire extrusion region as compared to the compositions comprising the commercially available comparative resins used for producing the conventional foams (flow pressure properties of the comparative resin are represented by bent lines 2 and 3, respectively). From FIG. 1, it is also apparent that the foaming composition of the specific resin to be used for producing the foam of the present invention exhibits high flow pressure beyond the vapor pressure of the foaming agent, which is indicated by line 4, at least in the region upstream of the land region (A) of the extrusion die. In general, the crossover points of line 4 (indicating the vapor pressure of the foaming agent) and the bent lines (showing the changes in flow pressure of foaming compositions) are the starting points of cell nucleation. Accordingly, in the case of the foaming composition comprising the specific resin to be used for producing the foam of the present invention (flow pressure properties of the specific resin are represented by bent line 1), the occurrence of foaming is completely suppressed on a side upstream of the region (A), so that cells E1 begin to be generated only when the foaming composition reaches the region (A), and the generated cells are gradually grown to large cells E2 while being extruded out of the die. From the above, it will be understood that the specific resin to be used for producing the foam of the present invention exhibits sufficient flow viscosity properties to suppress the occurrence of intradie foaming.

In contrast, as is apparent from FIG. 1, the comparative base resins used for producing the conventional foams (flow pressure properties of the comparative base resins are represented by bent lines 2 and 3) do not exhibit sufficient flow viscosity properties to suppress the occurrence of intradie foaming. When such a comparative base resin is used for producing a foam, foaming occurs in the region (B) [the process of cell generation in region (B) is not shown in FIG. 1], so that the lineal velocity of the composition (being foamed) in the extrusion direction is increased in the region (B) and in a region downstream thereof, whereas the pressure in the foaming composition is markedly lowered. As a result, a number of microcells are instantaneously generated and, at the same time, the foam (being produced) is rapidly cooled by the latent heat of the foaming agent, so that the foam is necessarily extruded out of the die in such a state that the hardening of the outer surface of the foam has advanced. Therefore, the produced foam has a thickness as small as only a thickness close to the size of the die opening. Furthermore, scale-like concave-convex portions occur in the surface of the produced foam by the influence of the friction which is produced in the land region of the extrusion die. On the other hand, the cells present in the non-cooled portions of the extruded product at an internal central portion thereof still continue to grow. As a result, in various portions of the foam, an internal stress is locally generated, which is followed by the occurrence of relief of the stress, so that the relief of the stress is likely to cause corrugation of the resultant foam thereover. For these reasons, from the comparative base resins used for producing the conventional foams (flow pressure properties of the comparative resins are represented by bent lines 2 and 3), good quality foams cannot be obtained.

The above-mentioned difference in flow viscosity properties between the comparative resins and the specific resins to be used for producing the foams of the present invention cannot be discussed, based merely on the difference in, for example, MFR property or melt tension property between the resins. The present inventors have had an idea such that since the increase in flow pressure of a foaming resin composition extruded in the extrusion region should depend on the extensional flow of the foaming composition flowing through the taper region (B) of the extrusion die, the extensional viscosity of the resin of the foaming composition should be taken into consideration. From these viewpoints, the present inventors have made intensive studies on the flow viscosity characteristics of resins, based on the biaxial extensional viscosity parameter. As a result, the essential points of the above-mentioned difference have been made clear for the first time.

Illustratively stated, it has been found that, when the base resin used for producing a foam has a biaxial extensional viscosity of at least $4.5 \times 10^6$ poise at a biaxial extensional strain of 0.2 (with respect to the matrix resin of the foam, the biaxial extensional viscosity thereof is at least $3 \times 10^6$ poise at a biaxial extensional strain of 0.2), the occurrence of a so-called intradie foaming of the foaming composition can be effectively suppressed. In other words, when the propylene polymer resin to be used for producing the foam of the present invention is used, the occurrence of the intradie foaming can be effectively suppressed to provide a good quality, thick foam even when a conventional extrusion foaming apparatus suitable for a polyethylene resin is used. According to the investigation by the present inventors, a propylene polymer resin having a biaxial extensional viscosity as large as $15 \times 10^6$ poise at a biaxial extensional strain of 0.2 can be successfully produced. When it is required to easily produce, by means of extruders having various functions, foams having various morphologies (in cross-section taken along a line vertical to the extrusion direction) and having large cross-sectional areas, it is desirable to use a resin having a biaxial extensional viscosity of from $6.0 \times 10^6$ to $15.0 \times 10^6$ poise at a biaxial extensional strain of 0.2.

Figure 2:
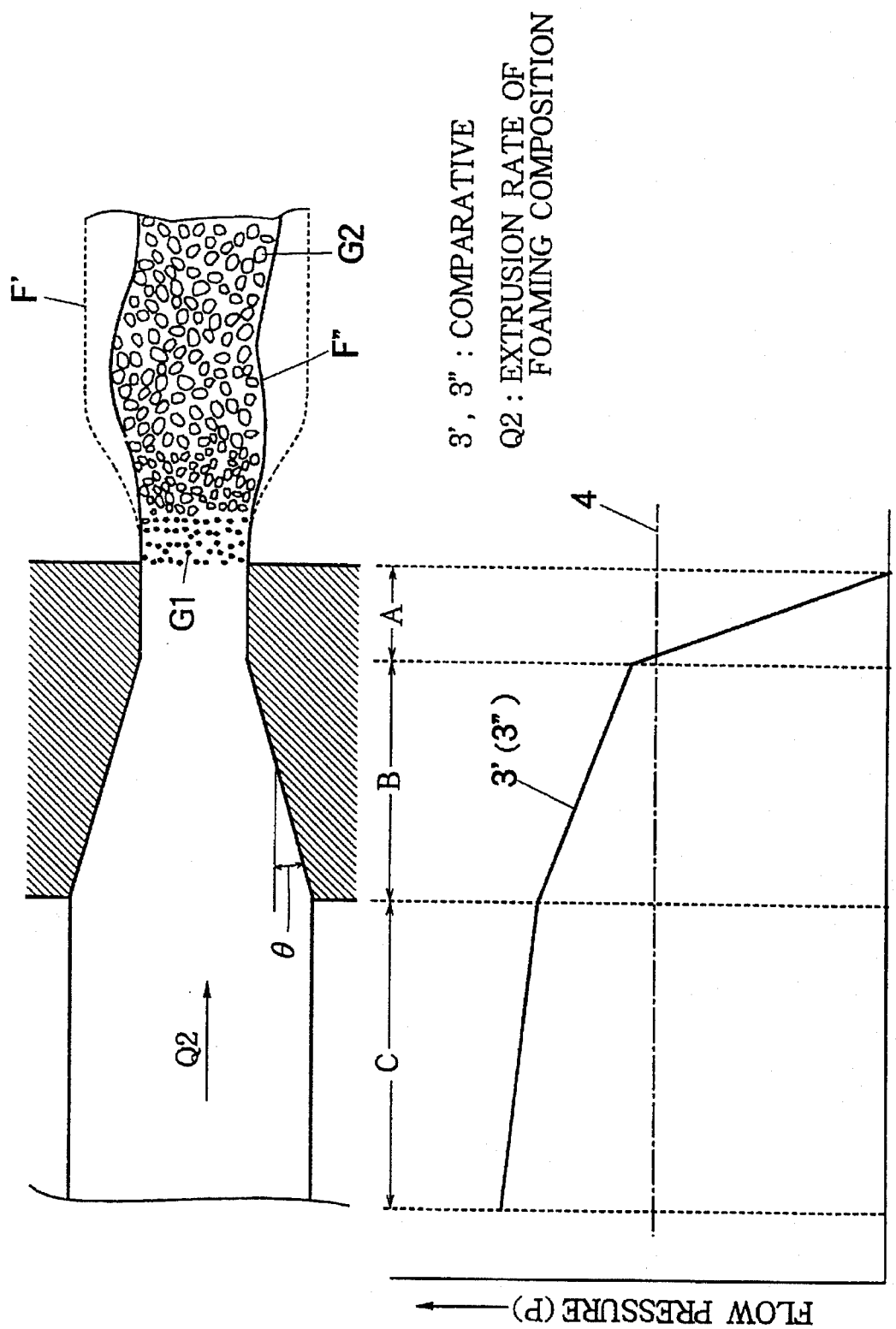
FIG. 2 is an explanatory diagram showing the growth of cells and formation of a foam in the vicinity of an extrusion die attached to an extruder (i.e., in the inside and outside of the extrusion region), wherein the foaming resin composition having properties represented by bent line 3 in FIG. 1 is used and the flow pressure of the foaming resin composition in the extruder is elevated by increasing the extrusion rate.
Figure 3:
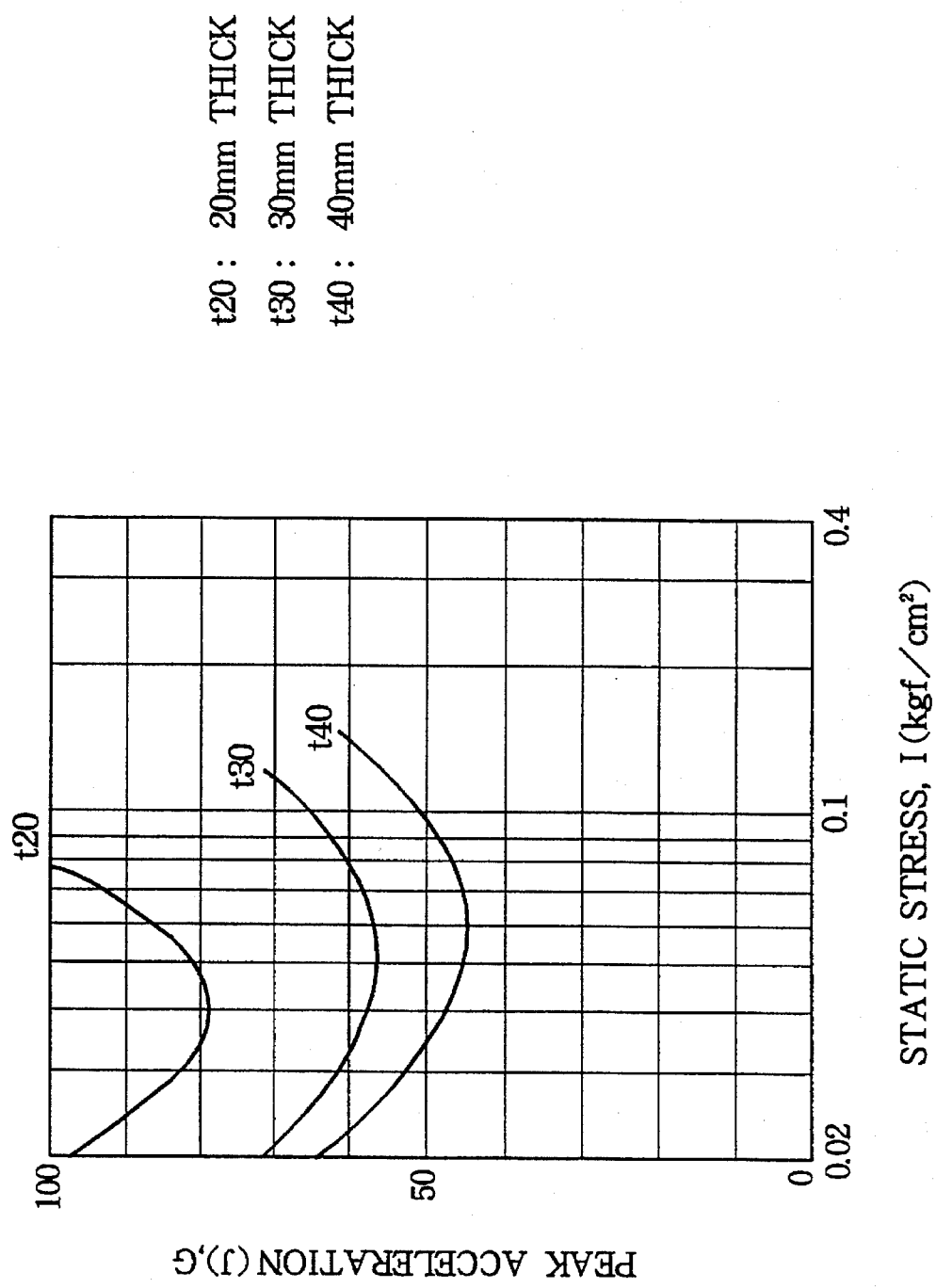
FIG. 3 is a graph of dynamic impact characteristic curves obtained using extruded polyethylene foams in accordance with the "Testing Methods of Dynamic Compression for Package Cushioning Materials" prescribed in Japanese Industrial Standards (JIS) Z 0235, showing the relationships between the static stress generated on the foam and the peak acceleration sustained by the weight in the one-time weight dropping test, with respect to resin foams having different thicknesses.

Next, the "retentivity of the cellular structure enriched with relatively large closed cells" as another important feature of the extruded foam of the present invention will be explained below, referring to FIG. 2 illustrating the behavior in the extrusion foaming of the foaming composition comprising the comparative base resin.

FIG. 2 is an explanatory diagram showing the growth of cells and formation of a foam in the vicinity of an extrusion die attached to an extruder (i.e., in the inside and outside of the extrusion region), wherein the resin having the flow pressure properties represented by bent line 3 in FIG. 1 is used and the flow pressure of the foaming composition comprising the resin in the extruder is elevated by increasing the extrusion rate. That is, a foaming composition comprising the comparative base resin having flow pressure properties represented by bent line 3 in FIG. 1 is used, and the extrusion rate of the foaming composition is elevated to Q2 to thereby increase the shear rate experienced by the foaming composition. In FIG. 2, the flow pressure of the foaming composition in the extrusion region is shown by line 3'(3"), and the growth of cells and the formation of a foam in the inside and outside of the extrusion region are diagrammatically shown. In FIG. 2, line 3' represents the flow pressure properties exerted by the same foaming composition as the foaming composition corresponding to line 3 in FIG. 1, and the generation of cells and the process of growth of a foam in the outside of the extrusion region are shown by broken line F'. Line 3" represents the flow pressure properties of the foaming composition having a component composition modified so as to improve the retentivity of the cellular structure of the foam produced from the resin corresponding to bent line 3', and the growth of cells and formation of a foam in the outside of the extrusion region are indicated by solid line F''' with respect to the case of line 3".

From FIG. 2, it can be understood that the flow pressure of a foaming composition can be controlled by changing the shear rate experienced by the composition in the inside of the extrusion region (which shear rate is varied depending on the extrusion rate of the foaming resin composition, relative to the die opening size) and, accordingly, it is possible to suppress the intradie foaming by appropriately selecting an extrusion apparatus to be used. The possibility of controlling the shear rate appears to be unlimited, if the economy of the apparatus is neglected. Therefore, in the case of both of the foaming compositions respectively having the flow pressure properties represented by bent lines 3' and 3" in FIG. 2, as in the case of the foaming composition having the flow pressure properties represented by bent line 1 in FIG. 1, the foaming of each foaming composition is completely suppressed in a region upstream of the region (A), so that cells G1 begin to be generated only when each foaming composition individually reaches the region (A) and the generated cells G1 are extruded out of the die and grow to become cells G2. However, in the case of the foaming composition having the flow pressure properties represented by bent line 3' in FIG. 2, because the extrusion rate of the foaming composition is elevated to Q2, the linear velocity of the produced foam in an extrusion direction is increased, so that the starting point of expansion of the foaming composition is shifted in the extrusion direction and the pressure of the foaming composition is rapidly lowered. As a result, a number of microcells are instantaneously generated and, at the same time, the outer surface of the resultant foam is rapidly cooled by the latent heat of the foaming agent which heat is generated at the foaming, to thereby harden the produced foam rapidly. Therefore, the foam thus formed becomes thinner than the foam D shown in FIG. 1. Furthermore, in this case, another serious problem occurs. That is, in the process in which the produced foam is cooled and hardened, the cell walls which define the closed cells in the foam are markedly broken, which causes a communication between the cells, leading to a rapid lowering of the closed cell ratio. When production of a foam having a more increased thickness is intended, the above cell communication phenomenon caused by the breakage of the cell walls is likely to be promoted to an extent such that a honeycomb-like void structure is produced in the foam (this phenomenon is hereinafter frequently referred to as "void phenomenon"). Therefore, when production of a foam having a thickness of at least 20 mm is intended, a high closed cell ratio cannot be achieved, which is a serious problem.

As a measure for solving this problem, it is conceivable to increase the amount of a cell nucleating agent (to be added to a foaming composition) to the same level as used in the foaming composition having the flow pressure properties represented by line 3", so as to increase the closed cell ratio of the resultant foam. However, when this method is used, cells G1 begin to be generated only when the foaming composition reaches the region (A), and the cells G1 are extruded out of the die and grow to become cells G2 as in the case of the foaming composition having the flow pressure properties represented by line 3'. However, in this method, a number of microcells G1 are instantaneously generated in the region (A). The vast plurality of microcells thus generated are cooled rapidly by the latent heat of the foaming agent (which heat is generated at the foaming) and, as a result, the outer surface of the extruded product is inevitably caused to be rapidly hardened. Thus, the outer size of the foam is caused to be fixed before the growth of cells is completed and, therefore, each of the cells becomes flat and the thickness of the resultant foam is not increased any more. On the other hand, the cells present in the non-cooled portions of the inner central portion of the extruded product continue to grow. As a result, the internal stress is locally generated in the resultant foam, which is followed by the occurrence of relief of the stress. When the stress is relieved, corrugation occurs over the entire foam, so that a wavy, plank foam comprising small cells is necessarily formed as shown by F''' in FIG. 2.

In other words, in the production of highly expanded foams, the use of the commercially available base resins which have been used for producing conventional foams is inevitably accompanied by the undesirable phenomena, such as "cell communication phenomenon" caused by the cell breakage and "corrugation phenomenon" such that a vast plurality of microcells are generated, so that the resultant foams cannot grow and have a satisfactory thickness, leading to a corrugation of the foam. Consequently, with the conventional base resins, it is impossible to realize the formation process of a foam which is illustrated in FIG. 1 [in which the specific base resin having flow pressure properties represented by bent line 1 is used (present invention)]. By contrast, in the present invention, an appropriate number of microcells E1 generated in the region A are smoothly extruded out of the extrusion region, and caused to grow and become large cells E2, so that expansion of the cells occurs as shown by an expansion locus represented by character D, and the cells are cooled and fixed as an assembly of substantially spherical cells enriched with closed cells to form a good quality, thick foam.

The difference in the above point between the specific base resin used for producing the foam of the present invention and the base resins used for producing the conventional foams is in that the former has the "capability of forming cells enriched with closed cells having a relatively large diameter and retentivity of the cells", whereas the latter does not have such properties. In other words, the base resin used for producing the foam of the present invention satisfies not only a requirement such that it should exhibit a biaxial extensional viscosity of at least $4.5 \times 10^6$ poise (with respect to the matrix resin of the foam, the biaxial extensional viscosity is at least $3 \times 10^6$ poise) at a biaxial extensional strain of 0.2, but also a requirement such that it should exhibit a biaxial strain hardening rate a of at least 0.30 (with respect to the matrix resin of the foam, the biaxial strain hardening rate is at least 0.25), wherein the biaxial strain hardening rate is defined herein, whereas any of the propylene polymer resins used in the conventional foams do not satisfy such requirements.

As mentioned above, the present inventors have presumed that the disadvantageous phenomena "breakage of cell walls of the foam and cell communication" occurring in the conventional foams during the course of cooling and hardening thereof are caused by the following two defects inherent in the resin used for forming the walls (membranes) of closed cells, namely, "high breakability of the cell walls in the course of cooling and hardening of the closed cells" and "difficulty in formation of cell membranes having an uniform thickness in the course of growing the closed cells". Based on this presumption, they have considered that in view of the fact that the walls of closed cells are constituted by faces, at least the biaxial properties of the resin, i.e., "biaxial extensional viscosity" and "biaxial strain hardening rate $\alpha$" of the resin, should be important, and have carried out intensive studies for developing a resin having the capability of forming cells enriched with closed cells having a relatively large diameter and the retentivity of the cells. As a result, they have succeeded in developing a base resin suitable for producing an extruded propylene polymer resin foam, and completed the present invention.

In the present invention, the above-mentioned properties for specifying the resin constituting the matrix (i.e., the matrix resin) of the foam are derived from the properties of the base resin used for producing the foam.

In the base resin to be used for producing the foam of the present invention, the requirement that the biaxial extensional viscosity of the base resin should be at least $4.5 \times 10^6$ poise at a biaxial extensional strain of 0.2 (with respect to the matrix resin of the foam, the biaxial extensional viscosity is at least $3.0 \times 10^6$ poise at a biaxial extensional strain of 0.2), contributes to the suppression of a flowing of the cell membrane of the resin which is still in a flowable state. By such suppression of the flow, the cell membranes are rendered so tough as to be sufficient to withstand the surface tension thereof, so that the cell membranes are not broken in the course of cooling and hardening thereof. On the other hand, the requirement that the biaxial strain hardening rate a of the base resin should be at least 0.30 (with respect to the matrix resin of the foam, the biaxial strain hardening rate is at least 0.25), contributes to a uniform flowing of the cell membrane resin which is still in a flowable state, so that cell membranes having a uniform thickness can be formed. This requirement further exerts advantageous effects also when unfavorable cell membranes having uneven thickness have been formed during the extension of the resin. That is, even when such unfavorable cell membranes have been formed, a high extensional viscosity is exerted in the thin portions of the cell membranes due to the strain hardening, so that not only are the cell membranes prevented from becoming thinner, but also the extension of the cell membranes at thick portions thereof having low extensional viscosity is advanced to thereby suppress thinning of the cell membranes on the whole. Thus, the local breakage of the cell membranes, which is likely to occur at the thin portions of the cell membrane, can be prevented in the course of the cooling and hardening of the cells. From the these viewpoints, for production of excellent foams having a high closed cell ratio, it is more preferred to use a base resin having a biaxial extensional viscosity of at least $5.0 \times 10^6$ poise (at least $3.3 \times 10^6$ poise for a matrix resin of the foam), and a biaxial strain hardening rate $\alpha$ of at least 0.35 (at least 0.30 for a matrix resin of the foam). It is most preferred to use a base resin having a biaxial extensional viscosity of at least $6.0 \times 10^6$ poise (at least $4.0 \times 10^6$ poise for a matrix resin of the foam) at a biaxial hardening rate $\alpha$ of 0.2, and a biaxial strain hardening rate $\alpha$ of from 0.40 to 0.60 (from 0.35 to 0.55 for a matrix resin of the foam). The present inventors have succeeded in producing a base resin exhibiting a biaxial strain hardening rate $\alpha$ as large as 0.70 (0.6 for a matrix resin of the foam).

The foam of the present invention can be produced by subjecting a foaming resin composition comprising the above-mentioned specific propylene polymer resin and a foaming agent to extrusion foaming. For producing the foam of the present invention, there can be employed a method called "extrusion foaming" in which a propylene polymer resin is melted with a foaming agent in an extruder at high temperature under high pressure to produce a foaming resin composition, and the produced foaming resin composition is cooled. The cooled resin composition is then extruded from the outlet of an extrusion die under low pressure (which extrusion die is provided at the forward end of the cylinder of the extruder), thereby obtaining an extruded propylene polymer resin foam.

Examples of foaming agents include an inorganic foaming agent, a volatilization type foaming agent and a decomposition type foaming agent. Specific examples of inorganic foaming agents include carbon dioxide, air and nitrogen gas. Specific examples of volatilization type foaming agents include aliphatic hydrocarbons, such as propane, n-butane, i-butane, pentane and hexane; alicyclic hydrocarbons, such as cyclobutane and cyclopentane; halogenated hydrocarbons, such as trichlorofluoromethane, dichlorodifluoromethane, tetrafluoroethane, difluoroethane, dichlorotetrafluoroethane, methyl chloride, ethyl chloride and methylene chloride. Specific examples of decomposition type foaming agents include azodicarbonamide, dinitrosopentamethylenetetramine, azobisisobutyronitrile and sodium bicarbonate. The above-mentioned foaming agents may be used individually or in combination. The foaming agent is used in an amount which has conventionally been used for production of resin foams.

With respect to the apparatus and conditions for the production of the foam of the present invention, it is desirable that the following three measures be taken for increasing the flow pressure of the foaming resin composition in the extruder and in the extrusion die, and for suppressing the occurrence of the so-called intradie foaming. The first measure is to use a heat stabilizer to be added to a base resin in an amount which is about 10% larger than the standard amount generally employed, thereby inhibiting the ultrahigh molecular moiety (which moiety is the most important feature of the base resin to be used in the production of the foam of the present invention) from lowering in molecular weight, which lowering is caused by cleavage of the molecular chain thereof in the extruder as mentioned below. The second measure is to control the internal temperature of the extruder so that the temperature of the resin retained in the extruder does not exceed 195° C. The third measure is to select an appropriate extruder screw so that the stress generated in the molecular chain of the resin becomes relatively small. Further, it is preferred to adjust the taper angle (θ) of the die which is attached to a forward end of the cylinder of the extruder (see FIG. 1) to about 40° to about 50°. The above-mentioned conditions are varied, depending on the type of the apparatus to be used. Therefore, it is preferred that those conditions be confirmed in advance by preliminary experiments.

In the production of the foam of the present invention, for increasing the thickness of the foam without increasing the extrusion rate of the resin, it is preferred that a base resin having a swell index S of 2 or more be used (in this case, the swell index S of the matrix resin of a foam to be produced becomes 1.8 or more), in addition to the use of a propylene polymer resin (as the base resin) exhibiting a biaxial extensional viscosity and biaxial strain hardening rate at specific ranges as mentioned above. Particularly, for obtaining a foam having a density of about 0.020 g/cm$^3$ and a thickness of at least 30 mm, it is especially preferred to use a base resin having a swell index S of 3.0 to 5.0 (in this case, the swell index S of the matrix resin of a foam to be produced becomes 2.0 to 3.5).

The extruded propylene polymer resin foam of the present invention has the specific foaming characteristics, i.e., a thickness of at least 20 mm, a density of from 0.005 to 0.03 g/cm$^3$, an average call diameter of from 0.4 to 2.0 mm, and a closed cell ratio of at least 80%.

The foam of the present invention exhibits 80 G or less in terms of minimum peak acceleration in the first weight dropping test according to (JIS) Z 0235 as mentioned above. Such a foam can be advantageously used as a cushion packaging material for household electric apparatus and the like. Further, according to the experiments conducted by the present inventors, the following has been confirmed. Even if the foam has a thickness of at least 20 mm, when the density thereof is less than 0.005 g/cm$^3$ or is more than 0.03 g/cm$^3$, the cushioning performance lowering index K disadvantageously exceeds 1.5, which is defined by the formula K=$J_{AV}/J_1$, wherein $J_1$ is a minimum peak acceleration in the first weight dropping test as mentioned above, and $J_{AV}$ is a minimum peak acceleration in the 2nd to 5th weight dropping tests as mentioned above. Therefore, such a foam cannot be used as a cushion packaging material without a danger of causing mechanical troubles and damages of a packaged article. Also, when the foam has a closed cell ratio of less than 80%, the cushioning performance lowering index K also disadvantageously exceeds 1.5, so that the foam is of no practical use as a cushion packaging material. Further, when the average cell diameter of the foam is less than 0.4 mm, not only does the corrugation occur, but also the compression stress anisotrophy Z (which is defined as a ratio of the compression stress generated in an extrusion direction in the production of a foam by extrusion to the compression stress generated in a thicknesswise direction) exceeds 1.5, so that the produced foam is caused to have a cushioning performance varied depending on the direction. Therefore, in actual use of the foam, it is necessary to carefully choose a direction in which the foam structure is used, which is cumbersome, so that the commercial value of such a direction-dependent foam as a cushion packaging material becomes very low. On the other hand, when the average cell diameter of the foam is more than 2.0 mm, such a foam has disadvantages in that not only is the surface appearance poor, but also the touch of the foam is unpleasant due to the large thickness of the cell wall, so that the commercial value of the foam becomes low also.

Further, as a cushion packaging material for a breakable article (which is extremely easy to break and hence requires a cushion packaging material therefor to exhibit 65 G or less in terms of minimum peak acceleration $J_1$ in the first weight dropping test as mentioned above), it is preferred to use a resin foam having a thickness of at least 30 mm in addition to the above-mentioned physical properties.

Further, for maintaining a cushioning performance (represented by a minimum peak acceleration $J_1$ in the first weight dropping test and a cushioning performance lowering index K) at a desired level, it is preferred that the density of the foam be 0.015 to 0.025 g/cm$^3$ and the closed cell ratio of the foam be at least 90%.

Figure 4:
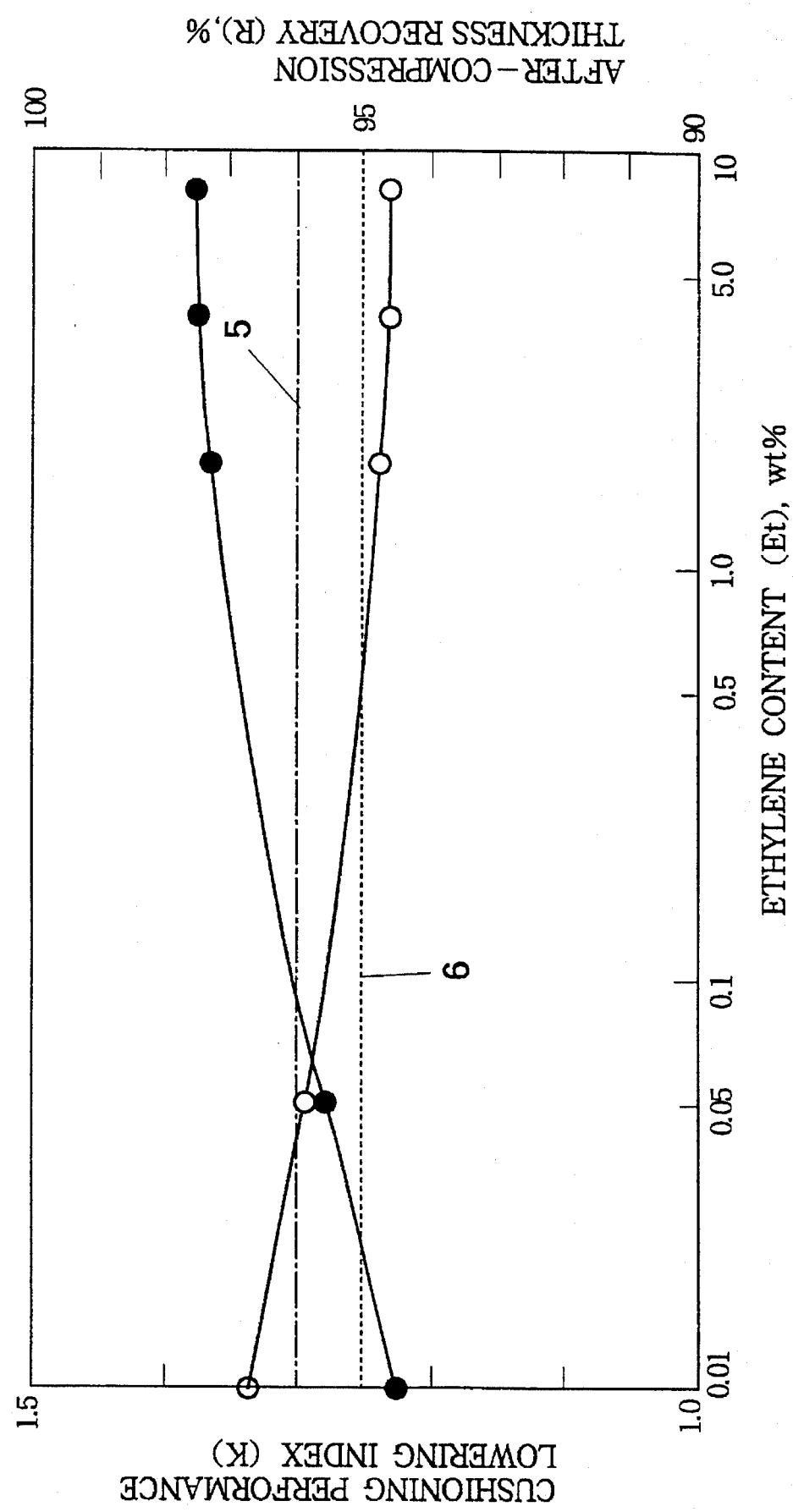
FIG. 4 is a graph obtained using the extruded propylene polymer resin foam of the present invention, wherein the relationship between the ethylene content and the cushioning performance lowering index K is shown together with the relationship between the ethylene content and the after-compression thickness recovery R.

In FIG. 4, a graph obtained using the extruded propylene polymer resin foam of the present invention is shown, wherein the relationship between the ethylene content and the cushioning performance lowering index K is shown together with the relationship between the ethylene content and the after-compression thickness recovery R.

In the graph of FIG. 4, the left-hand ordinate indicates the cushioning performance lowering index K in the range of from 1.0 to 1.5, which is graduated at 0.1 intervals; the right-hand ordinate indicates the after-compression thickness recovery R in the range of from 90 to 100%, which is graduated at 1% intervals; and the abscissa indicates the ethylene content having a logarithmic scale in the range of from 0.01 to 10% by weight. Also in the graph of FIG. 4, the open circles represent values of the cushioning performance lowering index K, and the closed circles represent values of the after-compression thickness recovery R. Line 5 (dot-and-dash line) represents the level of 1.3 with respect to the cushioning performance lowering index K, and line 6 (broken line) represents the level of 95% as an acceptable level with respect to the after-compression thickness recovery R. As mentioned above, the after-compression thickness recovery R is obtained by applying a pressure to the foam in a thicknesswise direction thereof to thereby compress the foam by 90% of the original foam thickness, relieving the foam from the pressure and allowing the relieved foam to stand for 24 hrs and recover the thickness thereof, and measuring the recovered foam thickness, wherein R is defined as the percentage of the recovered foam thickness, based on the original foam thickness. When the after-compression thickness recovery R is less than 95%, a thickness recovery of the foam after fabrication by compression cutting using a blade (which is one of the processing methods of foams) becomes unsatisfactory, so that the foam cannot be fabricated by compression cutting.

As is apparent from FIG. 4, for exhibiting an extremely excellent cushioning performance as low as 1.3 or less in terms of cushioning performance lowering index K, and exhibiting an excellent compression thickness recovery after a specific fabrication with compression, such as a fabrication by compression cutting, it is extremely effective for the matrix resin of the foam to contain ethylene. The effects of the ethylene component begin to be exhibited at the ethylene content of from 0.01% by weight, and remarkably increase at the ethylene content of 0.05 to 4% by weight, and the increase of the effects becomes gradual at the ethylene content of about 8% by weight. This fact shows that use of a resin containing ethylene is advantageous in the field of manufacturing cushion packaging materials in which a cushioning performance must be maintained at a high level even when a package repeatedly sustains impact, and in the field of processing cushion packaging materials by a specific fabrication with compression, such as a fabrication by compression cutting using a blade.

In the present invention, the Z average molecular weight (Mz) and weight average molecular weight (Mw) of the resin are each measured by gel permeation chromatography (GPC). It is desirable that the base resin to be used for producing the foam of the present invention be a propylene polymer resin having an Mz of at least $8\times10^6$, preferably $8\times10^6$ to $40\times10^6$ (in the case of the matrix resin, it is preferred that the propylene polymer resin have an Mz of at least $2\times10^6$, preferably $2\times10^6$ to $20\times10^6$), and an Mz/Mw value of at least 10, preferably 10 to 50 (in the case of the matrix resin, it is preferred that the propylene polymer resin have an Mz/Mw value of at least 5, preferably 5 to 25). Mz is used as a criterion for evaluating how a high molecular moiety contributes to the average molecular weight of the resin. On the other hand, Mw is used as a criterion for evaluating how a low molecular moiety contributes to the average molecular weight of the resin. Since the propylene polymer resins which have conventionally been used for producing a foam do not contain a moiety of ultrahigh molecular weight as high as at least $1.0\times10^7$ in a large amount, it is presumed that any of the conventional propylene polymer resins does not have an Mz of at least $8\times10^6$. The presence of the above-mentioned ultrahigh molecular weight moiety in the resin has the following three advantages, which conventional propylene polymer resins do not have. The first advantage resides in that a high biaxial strain hardening rate can be achieved in a foam to be produced because the molecular chains of such an ultrahigh molecular moiety are easily entangled with each other. The second advantage resides in that a high biaxial extension viscosity can be achieved in a foam to be produced. The third advantage resides in that a high swell index S can be achieved in a foam to be produced because the elasticity of the resin in a molten form becomes high.

The Mz/Mw value represents the breadth of a molecular weight distribution. In the conventional production of a resin foam, the use of a base resin having an Mz/Mw value as high as at least 10 has not yet been known.

A high Mz/Mw value means that the base resin contains a low molecular moiety in a large amount as well as the ultrahigh molecular moiety, as mentioned above. Due to the copresence of the low molecular moiety, the shear viscosity of the foaming resin composition to be used in the production of the foam of the present invention does not become so high despite the high content of the ultrahigh molecular moiety in the resin. Therefore, the use of a base resin having an Mz/Mw value as high as at least 10 is advantageous in that a load sustained by the screw of the extruder for use in the production of a foam can be suppressed to a low level.

However, in general, the accurate quantitative determination of an ultrahigh molecular weight moiety in a resin is difficult, and it is rather easy, accurate and recommendable to evaluate the content of the ultrahigh molecular moiety in a resin in terms of the viscoelasticity characteristics of the resin, i.e., a biaxial extensional viscosity and a biaxial strain hardening rate. For the above reasons, in the present invention, the characteristics of the resin are expressed in terms of the above-mentioned viscoelasticity characteristics.

With respect to the base resin to be used in the present invention, it is desired that the resin be a propylene polymer resin having a linear configuration. The reason for this is explained below. When a propylene polymer resin having a linear configuration is melt-kneaded in an extruder, a lowering of the biaxial extensional viscosity and a lowering of the biaxial strain hardening rate are small, as compared to the resin proposed in the above-mentioned WO 91/13933, i.e., "a specific propylene polymer resin comprising a major moiety of a linear propylene polymer and a minor moiety of side chains highly branched from the linear propylene polymer". Therefore, as the base resin to be used for producing a foam in which the properties of the resin after a melt kneading is important, a resin having a linear configuration is a quite suitable resin, which can be processed into a foam substantially without impairing the preselected critical properties of the resin. Further, it is noted that in the method disclosed in WO 91/13933 for producing the above-mentioned "specific propylene polymer resin comprising a major moiety of a linear propylene polymer and a minor moiety of side chains highly branched from the linear propylene polymer", the side chains highly branched from the linear propylene polymer are formed using electron beams or radiation. Therefore, it is believed that during the linking of side chains to the main chain (i.e., branching), a cleavage of the main chain is likely to occur, so that the viscosity of the resin as a whole cannot be raised and, therefore, it is impossible for the resin to have an ultrahigh molecular weight which contributes to the high biaxial extensional viscosity of the resin to be used for producing the foam of the present invention. Generally, as described in Unexamined Japanese Patent Application Laid-Open Specification No. 6-192460, the determination as to whether a resin has a linear configuration or a branched configuration can be conducted using a molecular weight distribution curve which is prepared, based on data obtained by a GPC method. In the above determination, when a rise like a camel's hump is present in the molecular weight distribution curve at a high molecular weight region thereof, the resin is judged as having a branched structure, whereas when no such rise is present, the resin is judged as having a linear configuration.

The preparation of a propylene polymer resin to be used as the base resin for producing the foam of the present invention can be conducted by, for example, a two-stage polymerization method in which the polymerization reaction is conducted in the presence of Ziegler-Natta catalyst in a polymerization vessel having a fixed bed provided with a stirrer (see, for example, Unexamined Japanese Patent Application Laid-Open Specification No. 4-226109 corresponding to EP 0 463 406 A2).

Specifically, the above-mentioned two-stage polymerization can be conducted using Ziegler-Natta catalyst which can be obtained by mixing and pulverizing, by means of a vibrating ball mill at a pulverizing acceleration of 45 to 55 $m.sec^{-2}$, a titanium- and aluminum-containing compound represented by formula (1):

$$TiCl_3.nAlCl_3 \qquad (1)$$

wherein n is from 0.1 to 0.4; and
an ester represented by formula (2):

$$R^1-O-CO-R^2 \qquad (2)$$

wherein $R^1$ represents an alkyl group having 1 to 8 carbon atoms, $R^2$ represents a phenylalkyl group having 7 to 14 carbon atoms or a phenyl group having 7 to 14 carbon atoms, wherein the total number of carbon atoms is 18 or less. [specific examples of esters represented by formula (2) include n-ethyl valerate and ethyl phenylbutylate.]

As a molecular weight controlling agent, hydrogen can be used. The first stage polymerization is conducted under conditions such that the polymerization pressure is from 30 to 40 kg/cm², the polymerization temperature is from 100° to 120° C., and the average residence time of the mixture of the reaction system is from 1 to 3 hours, to thereby obtain a propylene polymer resin having a viscosity ($MFR_1$) of from 1–14 g/10 min. Subsequently, the hydrogen as the molecular weight controlling agent is removed (more specifically, a hydrogen content is reduced to 0.005% by mole or less) and then, the propylene polymer resin obtained by the first polymerization is subjected to second stage polymerization under conditions such that the polymerization pressure is from 10 to 20 kgf/cm², the polymerization temperature is from 40° to 50° C., and the average residence time of the mixture of the reaction system is from 3 to 5 hours, to thereby obtain a propylene polymer resin in an amount of from 10 to 20 % by weight, based on the total amount of the propylene polymer resins obtained in the first stage and second stage polymerizations, wherein the propylene polymer resin obtained after the second stage polymerization has a viscosity ($MFR_2$) of from ¼ to ⅙ of the viscosity ($MFR_1$) of the propylene polymer resin obtained in the first stage polymerization.

In the above-mentioned two-stage polymerization, it is especially important to control the amount of the propylene polymer resin obtained in the second stage polymerization in the range of from 10 to 20% by weight, based on the total amount of the propylene polymer resins obtained in the first stage and second stage polymerizations, in order to obtain a propylene polymer resin having the above-mentioned advantageous characteristics, i.e., not only specific molecular weights, and specific molecular weight distribution, but also desired specific, viscoelasticity characteristics exerted depending thereon.

When the propylene polymer resin is a copolymer of propylene and an olefin other than propylene, such as ethylene, an olefin gas other than propylene can be added, in the second stage polymerization, to the propylene polymer resin obtained in the first stage polymerization. For example, when the above-mentioned olefin other than propylene to be added to the propylene polymer resin obtained in the first stage polymerization is ethylene, a propylene-ethylene copolymer resin having specific viscoelasticity characteristics which are essential in the present invention can be readily produced as long as an ethylene content thereof is from 0.05 to 8% by weight. The above-mentioned conditions for the polymerization may be varied depending on the type of apparatus used for the polymerization (i.e., morphology, structure or size of a polymerization reactor, morphology of an agitating blade, and the like). Accordingly, it is desired that a preliminary experiment be conducted in advance using a polymerization reactor to be actually used for preparation of a base resin, taking the above-mentioned polymerization conditions into consideration. In this case, the viscosity of the propylene polymer resin in each polymerization stage can be used as a criterion for controlling the polymerization conditions.

In the present invention, the propylene polymer resin can be a propylene homopolymer or a copolymer of propylene and an olefin other than propylene. Examples of usable olefins include ethylene, 1-butene, an isobutylene, 1-pentene, 3-methyl-1-butene, 1-hexene, 3,4-dimethyl-1-butene, 1-heptene and 3-methyl-1-hexene. Of these, ethylene is most preferred.

In the present invention, for facilitating the hardening of cells of the foam, a known crystal nucleating agent for a propylene polymer resin can be added to the foaming resin composition. Examples of crystal nucleating agents for a propylene polymer resin include an aluminum salt of an aromatic carboxylic acid, dibenzylidenesorbitol, a substituted dibenzylidene, sorbitol, and a sodium salt of methylenebis( 2,4,-di-t-butylphenol)acidphosphate. Further, if desired, for controlling the generation of cells, a cell nucleating agent can be added to the foaming composition. Examples of cell nucleating agents include inorganic powders, such as talc and silicon oxide, organic powders, such as zinc stearate and calcium stearate, and fine powders which are decomposed by heating to generate a gas, such as citric acid and sodium hydrogencarbonate. Further, as in the case of base resins for producing conventional foams, customary additives, such as an ultraviolet absorber, an antioxidant, an antistatic agent and a coloring agent, can be added in a desired amount.

BEST MODE FOR CARRYING OUT THE INVENTION

The present invention will be described in greater detail with reference to the following Referential Examples, Examples and Comparative Examples, which should not be construed as limiting the scope of the present invention.

Evaluation was made with respect to each of various properties of the foams obtained in Examples and Comparative Examples. The evaluation of each of the properties of the foams was made according to the following criterions.

Occurrence of corrugation phenomenon (evaluated in terms of the average cell diameter)

| Criteria | Evaluation symbol | Remarks (commercial value of the form) |
| --- | --- | --- |
| <0.4 mm | X | No commercial value (drastic corrugation phenomenon is observed) |
| 0.4 mm to less than 0.7 mm | Δ | Use is limited (slight corrugation phenomenon is observed) |
| ≧0.7 mm | O | High commercial value (no corrugation phenomenon is observed) |

Minimum peak acceleration $J_1$ at the one-time weight dropping test as the first dropping test

| Criteria | Evaluation symbol | Remarks (commercial value of the foam) |
| --- | --- | --- |
| >80 G | X | Unusable for cushion packaging materials for ordinary household electric apparatus |
| >65 G and ≦80 G | Δ | Usable for cushion packaging materials for ordinary household electric apparatus |
| ≧65 G | O | Usable for cushion packaging materials for fragile household electric apparatus |

Cushioning performance lowering index K

| Criteria | Evaluation symbol | Remarks (use as cushion packaging materials in applications in which the packaged articles sustain repeated impact) |
| --- | --- | --- |
| >1.5 | X | Unusable |
| >1.3 and ≦1.5 | Δ | Use is limited |
| ≦1.3 | O | Usable |

-continued

| After-compression thickness recovery R | | |
|---|---|---|
| Criteria | Evaluation symbol | Remarks (processability) |
| <95% | X | Fabrication by compression cutting using a blanking blade cannot be conducted |
| ≧95% | O | Fabrication by compression cutting using a blanking blade can be conducted |
| Compression stress anisotropy Z | | |
| Criteria | Evaluation symbol | Remarks (commercial value of the foam as cushion packaging materials) |
| >1.5 | X | No commercial value |
| <1.5 | O | Valuable |

Overall evaluation

On the basis of the above evaluations, the evaluations of the foams obtained in Examples and Comparative Examples were made as follows:

| Criteria | Evaluation symbol | Remarks |
|---|---|---|
| Foam having evaluation X for one item or more | X | No commercial value for use as a plank foam having a large thickness |
| Foam having evaluations O and Δ, but no evaluation X | Δ | Low commercial value for use as a plank foam having a large thickness |
| Foam having evaluation O for all items | O | High commercial value for use as a piano foam having a large thickness |

Referential Examples (Production of propylene polymer resins)

9 types of propylene polymer resins (resins 1 to 9) were produced according to the above-mentioned two-stage polymerization method, using a viscosity (MFR) as a criterion. With respect to each of the obtained resins 1 to 9, the characteristic properties were measured according to the method described above. Results are shown in Table 1 together with viscosities (MFR) as a control criterion. With respect to the propylene polymer matrix resins constituting the matrices of the extruded propylene polymer resin foams which resins were, respectively, obtained in Examples 1 to 17 using resins 1 to 9 and in Comparative Examples 1 to 6 using resins 3 to 4, results of the determination of the characteristic properties are shown in Table 2.

Resins 10 and 11 were obtained according to the above-mentioned two-stage polymerization method for producing a propylene polymer resin, except that some of the above-prescribed polymerization conditions for the first stage and second stage polymerizations were not satisfied. Further, 3 types of commercially available resins were provided as resins 12 to 14. Resin 12 is a polypropylene resin "E1100", manufactured and sold by Asahi Chemical Industry Co., Ltd., Japan; resin 13 is a polypropylene resin "E3100", manufactured and sold by Asahi Chemical Industry Co., Ltd., Japan; and resin 14 is "PF-815", manufactured and sold by HIMONT Inc., U.S.A., which is used in the Working Examples of the above-mentioned Unexamined Japanese Patent Application Laid-Open Specification No. H4-363227. Resins 10 to 14 were evaluated with respect to the characteristic values. Results are shown in Table 3 together with viscosities (MFR) as a control criterion. With respect to the propylene polymer matrix resins of the extruded propylene polymer resin foams respectively obtained in Comparative Examples 7 to 22 using resins 10 to 14, results of the determination of the characteristic properties are shown in Table 4.

$MFR_2$ values of resins 1 to 11 shown in Tables 1 and 3 are values which were obtained using pellets produced from a mixture of a polymerized resin in a powdery form and various additives using an extruder.

TABLE 1

| | | Base resin used for producing foams of Examples 1–17 and Comparative Examples 1–6 | | | | | | | | |
|---|---|---|---|---|---|---|---|---|---|---|
| | | Resin 1 | Resin 2 | Resin 3 | Resin 4 | Resin 5 | Resin 6 | Resin 7 | Resin 8 | Resin 9 |
| First stage polymerization conditions | Polymerization pressure (kg/cm²) | 34 | 36 | 32 | 38 | 39 | 35 | 35 | 31 | 34 |
| | Polymerization temperature (°C.) | 110 | 110 | 110 | 120 | 100 | 120 | 100 | 100 | 120 |
| | Average residence time of reaction mixture (hrs) | 2.5 | 2.0 | 1.5 | 1.0 | 2.5 | 3.0 | 2.0 | 2.5 | 2.0 |
| | $MFR_1$ of first stage polymerized powder | 2.4 | 5.5 | 10.7 | 12.0 | 8.3 | 7.9 | 8.1 | 7.5 | 6.8 |
| Second stage polymerization conditions | Polymerization pressure (kg/cm²) | 20 | 10 | 10 | 20 | 10 | 20 | 20 | 10 | 10 |
| | Polymerization temperature (°C.) | 40 | 50 | 50 | 50 | 40 | 40 | 40 | 50 | 40 |
| | Average residence time of reaction mixture (hrs) | 4.4 | 3.4 | 2.5 | 1.8 | 4.4 | 5.0 | 3.5 | 4.3 | 3.6 |
| | Second stage polymerization ratio (wt %) | 12 | 16 | 17 | 10 | 12 | 17 | 13 | 15 | 10 |
| | $MFR_2$ of second stage | 0.5 | 1.1 | 1.9 | 2.5 | 2.0 | 1.6 | 1.8 | 1.5 | 1.6 |

TABLE 1-continued

| | Base resin used for producing foams of Examples 1–17 and Comparative Examples 1–6 | | | | | | | | |
|---|---|---|---|---|---|---|---|---|---|
| | Resin 1 | Resin 2 | Resin 3 | Resin 4 | Resin 5 | Resin 6 | Resin 7 | Resin 8 | Resin 9 |
| polymerized powder (after pelletized) Z average molecular weight ($\times 10^{-6}$) | 12.9 | 29.6 | 20.0 | 10.5 | 18.2 | 21.0 | 26.7 | 31.2 | 33.8 |
| $M_z/M_w$ | 15.0 | 39.8 | 21.9 | 14.7 | 22.0 | 26.1 | 34.2 | 39.8 | 45.3 |
| Biaxial extensional viscosity (poise) ($\times 10^6$) | 10.0 | 8.6 | 6.7 | 4.6 | 9.7 | 11.4 | 10.3 | 12.0 | 9.3 |
| Biaxial strain hardening rate $\alpha$ | 0.45 | 0.54 | 0.48 | 0.34 | 0.43 | 0.59 | 0.56 | 0.58 | 0.47 |
| Swell index S | 3.4 | 3.2 | 3.2 | 2.8 | 3.0 | 3.4 | 3.2 | 3.3 | 3.3 |
| Melt tension (gf) | 9.4 | 10.5 | 9.6 | 4.8 | 9.2 | 14.8 | 14.2 | 15.7 | 9.3 |
| Ethylene content (wt %) | 0 | 0 | 0 | 0 | 0.0 | 0.05 | 1.80 | 4.00 | 8.00 |

TABLE 2

| | Matrix resin of foams produced in Example 1–17 and Comparative Examples 1–6 | | | | | | | | |
|---|---|---|---|---|---|---|---|---|---|
| | Resin 1 | Resin 2 | Resin 3 | Resin 4 | Resin 5 | Resin 6 | Resin 7 | Resin 8 | Resin 9 |
| Z average molecular weight ($\times 10^{-6}$) | 2.8 | 4.7 | 4.1 | 2.5 | 4.3 | 4.8 | 5.0 | 5.1 | 5.1 |
| $M_z/M_w$ | 5.5 | 9.4 | 9.2 | 5.3 | 8.7 | 10.1 | 10.7 | 11.1 | 11.2 |
| Biaxial extensional viscosity (poise) ($\times 10^{-6}$) | 7.3 | 6.9 | 5.3 | 3.9 | 7.2 | 8.5 | 8.0 | 8.4 | 7.8 |
| Biaxial strain hardening rate $\alpha$ | 0.42 | 0.48 | 0.42 | 0.31 | 0.38 | 0.51 | 0.48 | 0.52 | 0.42 |
| Swell index S | 2.9 | 2.7 | 2.7 | 2.2 | 2.4 | 2.8 | 2.6 | 2.7 | 2.7 |

TABLE 3

| | | Base resin used for producing foams of Comparative Examples 7–22 | | | | |
|---|---|---|---|---|---|---|
| | | Resin 10 | Resin 11 | Resin 12 | Resin 13 | Resin 14 |
| First stage polymerization conditions | Polymerization pressure (kg/cm²) | 28 | 32 | — | — | — |
| | Polymerization temperature (°C.) | 100 | 100 | — | — | — |
| | Average residence time of reaction mixture (hrs) | 2.5 | 2.0 | — | — | — |
| MFR₁ of first stage polymerized powder | | 15.1 | 15.5 | — | — | — |
| Second stage polymerization conditions | Polymerization pressure (kg/cm²) | 15 | 15 | — | — | — |
| | Polymerization temperature (°C.) | 50 | 40 | — | — | — |
| | Average residence time of reaction mixture (hrs) | 4.6 | 3.7 | — | — | — |
| Second stage polymerization ratio (wt %) | | 8 | 7 | — | — | — |
| MFR₂ of second stage polymerized powder (after pelletized) | | 5.7 | 6.2 | 0.5 | 0.5 | 3.0 |
| Z average molecular weight ($\times 10^{-6}$) | | 3.1 | 2.9 | 4.5 | 4.3 | 3.2 |
| $M_z/M_w$ | | 7.2 | 7.1 | 5.1 | 5.0 | 6.5 |
| Biaxial extensional viscosity (poise) ($\times 10^6$) | | 3.6 | 3.3 | 4.2 | 4.3 | 2.5 |
| Biaxial strain hardening rate $\alpha$ | | 0.31 | 0.26 | 0.22 | 0.20 | 0.44 |
| Swell index S | | 2.4 | 2.4 | 2.3 | 2.3 | 2.1 |
| Melt tension (gf) | | 4.1 | 3.5 | 4.2 | 1.2 | 13.8 |
| Ethylene content (wt %) | | 0 | 1.8 | 0 | 1.8 | 0 |

TABLE 4

|  | Matrix resin of foams produced in Comparative Examples 7–22 | | | | |
| --- | --- | --- | --- | --- | --- |
|  | Resin 10 | Resin 11 | Resin 12 | Resin 13 | Resin 14 |
| Z average molecuar weight (×10⁻⁶) | 1.7 | 1.6 | 2.3 | 2.2 | 1.8 |
| $M_z/M_2$ | 3.9 | 3.7 | 3.2 | 3.3 | 3.6 |
| Biaxial extensional viscosity (poise) (×10⁻⁶) | 2.5 | 2.4 | 3.5 | 3.0 | 1.2 |
| Biaxial strain hardening rate α | 0.22 | 0.20 | 0.16 | 0.17 | 0.36 |
| Swell index S | 1.9 | 1.8 | 1.9 | 1.9 | 1.7 |

EXAMPLE 1

Resin 1 was fed, at a rate of 50 kg per hour, to a feed zone of a screw extruder with a barrel having an inner diameter of 45 mm, and at the same time, a cell-nucleating agent (Cellborn SC-K, manufactured and sold by Eiwa Chemical Industry Co., Ltd., Japan) was added thereto in an amount of 0.02 part by weight per 100 parts by weight of resin 1.

The barrel temperature of the extruder was set at 190° C., and a foaming agent (a mixed foaming agent having a tetrafluoroethane/ethyl chloride molar ratio of ⅔) was fed to a mixing zone located at the forward end of the extruder in an amount of 18 parts by weight per 100 parts by weight of resin 1, to thereby obtain a foaming composition comprised of a molten mixture of resin 1, the foaming agent and the cell-nucleating agent. The obtained foaming composition was uniformly cooled to 155° C. in a cooling device connected to the outlet of the extruder. Subsequently, by a backward movement of the piston of a hydraulic cylinder, the foaming composition was charged into an accumulator having an internal volume of 3.6 liters and set at an extruding temperature of 155° C., while maintaining the internal pressure of the accumulator at a level which prevents foaming. Immediately after completion of the charging of the foaming composition into the accumulator, the shutting plate of an extrusion die (having a tapering angle of 45°, a width of the opening of 180 mm and a thickness of the opening of 1.5 mm) attached to the forward end of the accumulator was opened, and the piston of the hydraulic cylinder was moved forward so that the foaming composition in the accumulator was extruded at a lower limit extrusion rate at which a foaming does not occur in the extrusion die. The resultant extruded foam was immediately received between upper and lower pressure rolls, thereby shaping the foam.

The obtained foam was evaluated with respect to density, thickness, closed cell ratio, average cell diameter, minimum value $J_1$ of peak accelerations in the one-time weight dropping tests, cushioning performance lowering index K, after-compression thickness recovery R and compression stress anisotropy Z according to the methods described above. Results are shown in Table 5.

EXAMPLES 2 TO 17

Foams were obtained, in substantially the same manner as in Example 1, except that the resin, the amount of a foaming agent added, the amount of a cell-nucleating agent, and the thickness of a die opening were changed as shown in Table 5 and Table 6. The obtained foams were evaluated according to the above-mentioned evaluation methods. Results are shown in Table 5 and Table 6. However, with respect to the production conditions, it should be noted that in the Examples using resins 5 to 9, which contain ethylene, the cooling temperature of the resin in the cooling device and the internal temperature of the accumulator were set at a lower limit temperature in the range from 155° to 140° C., which lower limit temperature prevents a resin from being discharged from the die opening in a solidified form.

Tables 5 and 6 show that, when a base resin which satisfies the requirements defined in the present invention is used, a foam can be obtained which has not only a thickness of at least 20 mm, a satisfactorily high closed cell ratio and a low degree of a compression stress anisotropy but also exhibits 80 G or less in terms of minimum value $J_1$ of peak accelerations in the one-time weight dropping tests. Tables 5 and 6 also show that a foam can be obtained which, when having a thickness of 30 mm or more, exhibits an excellent cushioning performance represented by 65 G or less in terms of minimum value $J_1$ of peak accelerations in the one-time weight dropping tests. Further, Tables 5 and 6 show that the incorporation of ethylene is effective for maintaining the cushioning performance and improving the after-compression dimensional recovery.

The foams of Example 16 and Example 17 were obtained by slicing the foam obtained in Example 3 along a plane perpendicular to a thicknesswise direction of the foam so that the foams of Examples 16 and 17 had the respective thicknesses as shown in Table 6.

TABLE 5

|  | | Production conditions | | | Results of evaluation | | | | | | | |
| --- | --- | --- | --- | --- | --- | --- | --- | --- | --- | --- | --- | --- |
|  | Resin | Amount of foaming agent added (wt %)* | Amount of cell nucleating agent (wt %)* | Thickness of die opening (mm) | Density of foam (g/cm³) | Thickness of foam (mm) | Closed cell ratio (%) | Average cell diameter (mm) | Minimum value of peak acceleration (one-time weight dropping) $J_1$ | Cushioning performance lowering index K | After-compression thickness recovery R | Compression stress anisotropy Z | Overall evaluation |
| Example 1 | Resin 1 | 18 | 0.02 | 1.5 | 0.019 | 45 | 91 | 1.0 ○ | 42 ○ | 1.35 Δ | 93.9 Δ | 1.25 ○ | Δ |
| Example 2 | Resin 2 | 18 | 0.02 | 1.5 | 0.020 | 43 | 96 | 1.1 ○ | 44 ○ | 1.34 Δ | 94.1 Δ | 1.19 ○ | Δ |
| Example 3 | Resin 3 | 18 | 0.02 | 1.5 | 0.019 | 43 | 95 | 1.1 ○ | 43 ○ | 1.34 Δ | 94.2 Δ | 1.21 ○ | Δ |

TABLE 5-continued

| | | Production conditions | | | Results of evaluation | | | | | | | | |
|---|---|---|---|---|---|---|---|---|---|---|---|---|---|
| | Resin | Amount of foaming agent added (wt %)* | Amount of cell nucleating agent (wt %)* | Thickness of die opening (mm) | Density of foam (g/cm$^3$) | Thickness of foam (mm) | Closed cell ratio (%) | Average cell diameter (mm) | Minimum value of peak acceleration (one-time weight dropping) $J_1$ | Cushioning performance lowering index K | After-compression thickness recovery R | Compression stress anisotropy Z | Overall evaluation |
| Example 4 | Resin 4 | 18 | 0.02 | 1.5 | 0.020 | 37 | 86 | 1.0 ○ | 44 ○ | 1.45 Δ | 92.5 Δ | 1.23 ○ | Δ |
| Example 5 | Resin 3 | 15 | 0.02 | 1.5 | 0.026 | 41 | 93 | 1.2 ○ | 41 ○ | 1.42 Δ | 92.7 Δ | 1.15 ○ | Δ |
| Example 6 | Resin 3 | 25 | 0.02 | 1.5 | 0.014 | 47 | 97 | 0.9 ○ | 43 ○ | 1.41 Δ | 92.9 Δ | 1.36 ○ | Δ |
| Example 7 | Resin 3 | 40 | 0 | 1.5 | 0.010 | 42 | 96 | 0.8 ○ | 52 ○ | 1.47 Δ | 92.3 Δ | 1.44 ○ | Δ |

*wt parts per 100 wt parts of resin

TABLE 6

| | | Production conditions | | | Results of evaluation | | | | | | | | |
|---|---|---|---|---|---|---|---|---|---|---|---|---|---|
| | Resin | Amount of foaming agent added (wt %)* | Amount of cell nucleating agent (wt %)* | Thickness of die opening (mm) | Density of foam (g/cm$^3$) | Thickness of foam (mm) | Closed cell ratio (%) | Average cell diameter (mm) | Minimum value of peak acceleration (one-time weight dropping) $J_1$ | Cushioning performance lowering index K | After-compression thickness recovery R | Compression stress anisotropy Z | Overall evaluation |
| Example 8 | Resin 5 | 18 | 0.02 | 1.5 | 0.019 | 45 | 97 | 1.0 ○ | 43 ○ | 1.33 Δ | 94.5 Δ | 1.24 ○ | Δ |
| Example 9 | Resin 6 | 18 | 0.02 | 1.5 | 0.019 | 42 | 98 | 0.9 ○ | 42 ○ | 1.29 Δ | 95.5 ○ | 1.27 ○ | ○ |
| Example 10 | Resin 7 | 18 | 0.02 | 1.5 | 0.020 | 41 | 97 | 0.8 ○ | 41 ○ | 1.24 Δ | 97.2 ○ | 1.34 ○ | ○ |
| Example 11 | Resin 8 | 18 | 0.02 | 1.5 | 0.019 | 43 | 98 | 0.9 ○ | 40 ○ | 1.23 Δ | 97.5 ○ | 1.30 ○ | ○ |
| Example 12 | Resin 9 | 18 | 0.02 | 1.5 | 0.020 | 44 | 97 | 1.0 ○ | 41 ○ | 1.23 Δ | 97.5 ○ | 1.25 ○ | ○ |
| Example 13 | Resin 7 | 15 | 0.02 | 1.5 | 0.024 | 40 | 95 | 1.2 ○ | 39 ○ | 1.28 Δ | 96.5 ○ | 1.17 ○ | ○ |
| Example 14 | Resin 7 | 25 | 0.02 | 1.5 | 0.013 | 45 | 97 | 0.9 ○ | 42 ○ | 1.27 Δ | 96.8 ○ | 1.38 ○ | ○ |
| Example 15 | Resin 7 | 40 | 0 | 1.5 | 0.010 | 40 | 96 | 0.8 ○ | 51 ○ | 1.29 Δ | 96.1 ○ | 1.44 ○ | ○ |
| Example 16 | Resin 3 | 18 | 0.02 | 1.5 | 0.019 | Slice 25 | 95 | 1.1 ○ | 73 Δ | 1.35 Δ | 94.0 ○ | 1.21 | Δ |
| Example 17 | Resin 3 | 18 | 0.02 | 1.5 | 0.019 | Slice 35 | 95 | 1.1 ○ | 52 ○ | 1.34 Δ | 94.2 Δ | 1.21 ○ | Δ |

*wt parts per 100 wt parts of resin

COMPARATIVE EXAMPLES 1 TO 6

Foams were obtained in substantially the same manner as in Example 1, except that the resin, the amount of a foaming agent added, the amount of a cell-nucleating agent, and the thickness of a die opening were changed as shown in Table 7. The foam of Comparative Example 1 was obtained by slicing the foam obtained in Example 3 along a plane perpendicular to a thicknesswise direction of the foam so that the foam of Comparative Example 1 had the thickness as shown in Table 7. The foams obtained in Comparative Examples 1 to 6 were evaluated according to the above-mentioned evaluation methods. Results are shown in Table 7.

Table 7 shows that a foam having a thickness of less than 20 mm cannot exhibit 80 G or less in terms of minimum value $J_1$ of peak accelerations in the one-time weight dropping tests, 80 G or less being a value which is generally necessary for exerting a satisfactory cushioning performance on articles, such as household electric apparatus, etc. Table 7 also shows that there exist optimum ranges for a density of a foam and a closed cell ratio from the viewpoint of the maintenance of the cushioning performance and that there exists an optimum range for an average cell diameter from the viewpoint of obtaining high uniformities in compression stress and cushioning performance irrespective of a direction of use.

COMPARATIVE EXAMPLES 7 TO 13

Foams were obtained in substantially the same manner as in Example 1, except that the resin, the amount of a foaming agent added, the amount of a cell-nucleating agent, and the thickness of a die opening were changed as shown in Table 8. With respect to the production conditions, it should be noted that in the Examples using resins 11 and 13, which contain ethylene, the cooling temperatures of the resins in the cooling device and the internal temperature of the accumulator were set at a lower limit temperature in the range from 155° to 140° C., which lower limit temperature prevents a resin from being discharged from the die opening in a solidified form. The obtained foams were evaluated according to the above-mentioned evaluation methods. Results are shown in Table 8.

The results show that when a known, commercially available resin is used, a foam which has a void or is extremely low in a closed cell ratio is obtained even if the amount of a cell-nucleating agent is the same as employed in Example 1. The results also show that when a known, commercially available resin is used, it is very difficult to obtain a foam having a thickness of at least 20 mm and exhibiting an excellent performance, such as a high cushioning performance.

Foams were obtained in substantially the same manner as in Example 1, except that the resin, the amount of a foaming agent added, the amount of a cell-nucleating agent, and the thickness of a die opening were changed as shown in Table 9. With respect to the production conditions, it should be noted that in the Examples using resins 11 and 13, which contain ethylene, the cooling temperatures of the resins in the cooling device and the internal temperature of the accumulator were set at a lower limit temperature in the range from 155° to 140° C., which lower limit temperature prevents a resin from being discharged from the die opening in a solidified form. The obtained foams were evaluated according to the above-mentioned evaluation methods. Results are shown in Table 9.

The results show that when a known, commercially available resin is used, a foam which has a closed cell ratio of at least 80% cannot be obtained even if the amount of a cell-nucleating agent added is increased in order to improve a closed cell ratio. The results also show that when a known, commercially available resin is used, the obtained foam has high anisotropy in each of compression stress and cushioning performance, and has a thickness of 20 mm or less.

TABLE 7

| | | Production conditions | | | | | Results of evaluation | | | | | |
|---|---|---|---|---|---|---|---|---|---|---|---|---|
| | Resin | Amount of foaming agent added (wt %)* | Amount of cell nucleating agent (wt %)* | Thickness of die opening (mm) | Density of foam (g/cm$^3$) | Thickness of foam (mm) | Closed cell ratio (%) | Average cell diameter (mm) | Minimum value of peak acceleration (one-time weight dropping) $J_1$ | Cushioning performance lowering index K | After-compression thickness recovery R | Compression stress anisotropy Z | Overall evaluation |
| Comparative Example 1 | Resin 3 | 18 | 0.02 | 1.5 | 0.019 | Slice 15 | 95 | 1.1 ○ | 85 X | 1.36 Δ | 93.8 Δ | 1.21 ○ | X |
| Comparative Example 2 | Resin 3 | 5 | 0.02 | 4.0 | 0.096 | 46 | 94 | 1.3 ○ | 41 ○ | 1.61 X | 91.7 Δ | 1.05 ○ | X |
| Comparative Example 3 | Resin 3 | 8 | 0.02 | 2.5 | 0.045 | 44 | 92 | 1.3 ○ | 39 ○ | 1.53 X | 92.0 Δ | 1.09 ○ | X |
| Comparative Example 4 | Resin 3 | 80 | 0 | 1.0 | 0.003 | 24 | 97 | 0.8 ○ | 55 ○ | 1.64 X | 91.5 Δ | 1.47 ○ | X |
| Comparative Example 5 | Resin 4 | 18 | 0 | 1.5 | 0.021 | 38 | 75 | 1.5 ○ | 41 ○ | 1.53 X | 92.1 Δ | 1.10 ○ | X |
| Comparative Example 6 | Resin 3 | 18 | 0.25 | 1.5 | 0.019 | 31 | 98 | 0.3 X | 57 ○ | 1.36 Δ | 93.8 Δ | 1.57 X | X |

*wt parts per 100 wt parts of resin

COMPARATIVE EXAMPLES 14 TO 22

Foams were obtained in substantially the same manner as in Example 1, except that the resin, the amount of a foaming

TABLE 8

| | | Production conditions | | | Results of evaluation | | | | | | | | |
|---|---|---|---|---|---|---|---|---|---|---|---|---|---|
| | Resin | Amount of foaming agent added (wt %)* | Amount of cell nucleating agent (wt %)* | Thickness of die opening (mm) | Density of foam (g/cm³) | Thickness of foam (mm) | Closed cell ratio (%) | Average cell diameter (mm) | Minimum value of peak acceleration (one-time weight dropping) $J_1$ | Cushioning performance lowering index K | After-compression thickness recovery R | Compression stress anisotropy Z | Overall evaluation |
| Comparative Example 7 | Resin 10 | 18 | 0.02 | 1.5 | 0.028 | 28 | Voids** | 1.1 ○ | 70 Δ | 1.62 X | 91.7 Δ | 1.32 ○ | X |
| Comparative Example 8 | Resin 11 | 18 | 0.02 | 1.5 | 0.030 | 26 | Voids** | 1.1 ○ | 72 Δ | 1.57 X | 92.5 Δ | 1.34 ○ | X |
| Comparative Example 9 | Resin 12 | 18 | 0.02 | 1.5 | 0.029 | 27 | Voids** | 1.0 ○ | 70 Δ | 1.64 X | 91.5 Δ | 1.31 ○ | X |
| Comparative Example 10 | Resin 13 | 18 | 0.02 | 1.5 | 0.030 | 28 | Voids** | 1.1 ○ | 69 Δ | 1.56 X | 92.6 Δ | 1.35 ○ | X |
| Comparative Example 11 | Resin 14 | 18 | 0.02 | 1.5 | 0.027 | 29 | Voids** | 1.0 ○ | 68 Δ | 1.63 X | 91.6 Δ | 1.32 ○ | X |
| Comparative Example 12 | Resin 12 | 15 | 0.02 | 1.5 | 0.036 | 25 | Voids** | 1.2 ○ | 71 Δ | 1.65 X | 91.3 Δ | 1.36 ○ | X |
| Comparative Example 13 | Resin 12 | 25 | 0.02 | 1.5 | 0.023 | 32 | Voids** | 0.9 ○ | 65 ○ | 1.63 X | 91.7 Δ | 1.39 ○ | X |

*wt parts per 100 wt parts of resin
**not measured because voids occurred

TABLE 9

| | | Production conditions | | | Results of evaluation | | | | | | | | |
|---|---|---|---|---|---|---|---|---|---|---|---|---|---|
| | Resin | Amount of foaming agent added (wt %)* | Amount of cell nucleating agent (wt %)* | Thickness of die opening (mm) | Density of foam (g/cm³) | Thickness of foam (mm) | Closed cell ratio (%) | Average cell diameter (mm) | Minimum value of peak acceleration (one-time weight dropping) $J_1$ | Cushioning performance lowering index K | After-compression thickness recovery R | Compression stress anisotropy Z | Overall evaluation |
| Comparative Example 14 | Resin 10 | 18 | 0.25 | 1.5 | 0.025 | 17 | 59 | 0.3 X | 84 X | 1.64 X | 91.5 Δ | 1.63 X | X |
| Comparative Example 15 | Resin 11 | 18 | 0.25 | 1.5 | 0.026 | 16 | 50 | 0.3 X | 84 X | 1.55 X | 92.2 Δ | 1.67 X | X |
| Com- | Resin | 18 | 0.25 | 1.5 | 0.027 | 15 | 20 | 0.3 | 85 | 1.64 | 91.4 | 1.65 | X |

TABLE 9-continued

| | | Production conditions | | | | | | Results of evaluation | | | | | |
|---|---|---|---|---|---|---|---|---|---|---|---|---|---|
| | Resin | Amount of foaming agent added (wt %)* | Amount of cell nucleating agent (wt %)* | Thickness of die opening (mm) | Density of foam (g/cm³) | Thickness of foam (mm) | Closed cell ratio (%) | Average cell diameter (mm) | Minimum value of peak acceleration (one-time weight dropping) $J_1$ | Cushioning performance lowering index K | After-compression thickness recovery R | Compression stress anisotropy Z | Overall evaluation |
| Comparative Example 16 | 12 | | | | | | | | X | X | X | Δ | X |
| Comparative Example 17 | Resin 13 | 18 | 0.25 | 1.5 | 0.026 | 15 | 24 | 0.3 X | 85 X | 1.54 X | 92.7 Δ | 1.64 X | X |
| Comparative Example 18 | Resin 13 | 15 | 0.25 | 1.5 | 0.034 | 13 | 17 | 0.3 X | 89 X | 1.55 X | 92.6 Δ | 1.72 X | X |
| Comparative Example 19 | Resin 13 | 25 | 0.25 | 1.5 | 0.021 | 17 | 31 | 0.3 X | 82 X | 1.54 X | 92.8 Δ | 1.68 X | X |
| Comparative Example 20 | Resin 14 | 18 | 0.25 | 1.5 | 0.024 | 16 | 65 | 0.3 X | 84 X | 1.61 X | 92.0 Δ | 1.69 X | X |
| Comparative Example 21 | Resin 14 | 15 | 0.25 | 1.5 | 0.031 | 14 | 45 | 0.3 X | 87 X | 1.65 X | 91.3 Δ | 1.62 X | X |
| Comparative Example 22 | Resin 14 | 25 | 0.25 | 1.5 | 0.018 | 19 | 72 | 0.3 X | 82 X | 1.60 X | 91.0 Δ | 1.70 X | X |

*wt parts per 100 wt parts of resin

INDUSTRIAL APPLICABILITY

The extruded propylene polymer resin foam of the present invention is a single layer foam having a thickness of at least 20 mm, a density of from 0.005 to 0.03 g/cm³, an average cell diameter of from 0.4 to 2.0 mm, and a closed cell ratio of at least 80%. Therefore, the foam of the present invention exhibits 80 G or less in terms of the minimum peak acceleration when tested in accordance with the "Testing Methods of Dynamic Compression for Package Cushioning Materials" prescribed in Japanese Industrial Standards (JIS) Z 0235, in which weights are dropped from a height of 60 cm on the foam. Thus, the extruded propylene polymer resin foam exhibits not only high cushioning performance and mechanical strength properties, but also has light weight, so that, after fabricated into various sizes by cutting, the resultant resin foam articles can be advantageously used in the fields of cushion packaging materials, floating materials, and heat insulating materials.

We claim:

1. An extruded propylene polymer resin foam comprising a plurality of closed cells defined by cell walls which constitute a matrix of said foam, said matrix comprising a propylene polymer resin exhibiting a biaxial extensional viscosity of at least $3.0 \times 10^6$ poise at a biaxial extensional strain of 0.2, and a biaxial strain hardening rate α of at least 0.25, said biaxial strain hardening rate α being defined by the following formula:

$$\alpha = 0.77 \times (\log \eta_2 - \log \eta_1)$$

wherein $\eta_1$ represents the biaxial extensional viscosity at a biaxial extensional strain of 0.01, and $\eta_2$ represents the biaxial extensional viscosity at a biaxial extensional strain of 0.2, wherein said foam has a thickness of at least 20 mm, a density of from 0.005 to 0.03 g/cm³, an average cell diameter of from 0.4 to 2.0 mm, and a closed cell ratio of at least 80%, in which said closed cell ratio is defined as the percentage of the volume of closed cells, based on the total volume of the closed cells and open cells in the foam.

2. The foam according to claim 1, having a thickness of at least 30 mm.

3. The foam according to claim 1, exhibiting 80 G or less in terms of minimum value $J_1$ of peak accelerations respectively sustained by a predetermined number of different weights in the one-time weight dropping tests in which the predetermined number of different weights respectively capable of generating different static stresses in the range of from 0.02 to 0.4 kgf/cm² on the foam are used and the respective weights are individually dropped once from a height of 60 cm on the foam to obtain peak accelerations with respect to static stresses, wherein $J_1$ is defined as a minimum value of the peak accelerations, which minimum value is read from a smooth curve obtained by plotting the peak acceleration against the static stress.

4. The foam according to claim 1, having 1.5 or less in terms of a cushioning performance lowering index K which is defined by the formula:

$$K=J_{AV}/J_1$$

wherein $J_1$ is as defined in claim 3, and $J_{AV}$ is obtained by repeating 4 times the same weight dropping tests as defined in claim 3 after said one-time weight dropping test as defined as the first dropping test, obtaining four peak acceleration values in the 2nd to 5th dropping tests with respect to respective static stresses, calculating average peak acceleration values with respect to respective static stresses, and reading a minimum value $J_{AV}$ of the average peak accelerations from a smooth curve obtained by plotting the average peak acceleration value against the static stress.

5. The foam according to claim 1, having 1.3 or less in terms of cushioning performance lowering index K as defined in claim 4.

6. The foam according to claim 1, having at least 95% in terms of after-compression thickness recovery R, which is obtained by applying a pressure to the foam in a thickness-wise direction thereof at a rate of 500 mm/min to thereby compress the foam by 90% of the original foam thickness, relieving the foam from the pressure and allowing the relieved foam to stand for 24 hrs and recover the thickness thereof, and measuring the recovered foam thickness, wherein R is defined as the percentage of the recovered foam thickness, based on the original foam thickness.

7. The foam according to claim 1, exhibiting a compression stress anisotropy Z of 1.5 or less.

8. The foam according to claim 1, wherein said propylene polymer resin is a linear polymer resin.

9. The foam according to claim 1, wherein said propylene polymer resin has an ethylene content of from 0.05 to 8% by weight.

10. The foam according to claim 1, wherein said propylene polymer resin has 1.8 or more in terms of a swell index S which is obtained by extruding the propylene polymer resin in a molten form in a vertical direction at a shear rate of 650 sec$^{-1}$ through a capillary having an inner diameter of 2.095 mm and a length of 8.0 mm to thereby obtain a ribbon resin extrudate, wherein S is defined as a ratio of the diameter of the extrudate to the inner diameter of said capillary.

11. The foam according to claim 1, wherein said propylene polymer resin has a Z average molecular weight of at least 2×10$^6$ and an Mz/Mw value of at least 5, wherein Mz and Mw are, respectively, a Z average molecular weight and a weight average molecular weight, each measured by gel permeation chromatography.

* * * * *